United States Patent
Barton et al.

(10) Patent No.: US 6,233,389 B1
(45) Date of Patent: May 15, 2001

(54) MULTIMEDIA TIME WARPING SYSTEM

(75) Inventors: James M. Barton, Los Gatos; Roderick James McInnis, Milpitas; Alan S. Moskowitz, San Francisco; Andrew Martin Goodman, Menlo Park; Ching Tong Chow, Fremont; Jean Swey Kao, Cupertino, all of CA (US)

(73) Assignee: TiVo, Inc., Alviso, CA (US)

( * ) Notice: Subject to any disclaimer, the term of this patent is extended or adjusted under 35 U.S.C. 154(b) by 0 days.

(21) Appl. No.: 09/126,071

(22) Filed: Jul. 30, 1998

(51) Int. Cl.⁷ .................................................. H04N 5/92

(52) U.S. Cl. .............................................. 386/46; 386/68

(58) Field of Search ................................... 386/1, 33, 45, 386/46, 111–112, 125–126, 68; 369/60; 366/7, 33; 348/7, 10, 571, 714, 722, 725; H04N 5/76, 5/92, 9/79, 5/14

(56) References Cited

U.S. PATENT DOCUMENTS

| Re. 33,535 | 2/1991 | Cooper | 358/149 |
|---|---|---|---|
| 4,313,135 | 1/1982 | Cooper | 358/149 |
| 4,665,431 | 5/1987 | Cooper | 358/145 |
| 5,202,761 | 4/1993 | Cooper | 358/149 |
| 5,371,551 | 12/1994 | Logan et al. | 348/571 |
| 5,438,423 | 8/1995 | Lynch et al. | 358/335 |
| 5,550,594 | 8/1996 | Cooper et al. | 348/513 |
| 5,572,261 | 11/1996 | Cooper | 348/512 |

(List continued on next page.)

FOREIGN PATENT DOCUMENTS 0726574   8/1996   (EP) .......................... G11B/27/034

OTHER PUBLICATIONS

ASTARTE DVDirector™ Beta Testing Program.

Primary Examiner—Thai Tran
(74) Attorney, Agent, or Firm—Michael A. Glenn; Kirk Wong

(57) ABSTRACT

A multimedia time warping system. The invention allows the user to store selected television broadcast programs while the user is simultaneously watching or reviewing another program. A preferred embodiment of the invention accepts television (TV) input streams in a multitude of forms, for example, National Television Standards Committee (NTSC) or PAL broadcast, and digital forms such as Digital Satellite System (DSS), Digital Broadcast Services (DBS), or Advanced Television Standards Committee (ATSC). The TV streams are converted to an Moving Pictures Experts Group (MPEG) formatted stream for internal transfer and manipulation and are parsed and separated it into video and audio components. The components are stored in temporary buffers. Events are recorded that indicate the type of component that has been found, where it is located, and when it occurred. The program logic is notified that an event has occurred and the data is extracted from the buffers. The parser and event buffer decouple the CPU from having to parse the MPEG stream and from the real time nature of the data streams which allows for slower CPU and bus speeds and translate to lower system costs. The video and audio components are stored on a storage device and when the program is requested for display, the video and audio components are extracted from the storage device and reassembled into an MPEG stream which is sent to a decoder. The decoder converts the MPEG stream into TV output signals and delivers the TV output signals to a TV receiver. User control commands are accepted and sent through the system. These commands affect the flow of said MPEG stream and allow the user to view stored programs with at least the following functions: reverse, fast forward, play, pause, index, fast/slow reverse play, and fast/slow play.

61 Claims, 12 Drawing Sheets

U.S. PATENT DOCUMENTS

| | | | |
|---|---|---|---|
| 5,675,388 | 10/1997 | Cooper | 348/461 |
| 5,696,868 | 12/1997 | Kim et al. | 386/46 |
| 5,706,388 | 1/1998 | Isaka | 386/125 |
| 5,787,225 * | 7/1998 | Honjo | 386/111 |
| 5,920,842 | 7/1999 | Cooper et al. | 704/503 |
| 5,937,138 * | 8/1999 | Fukuda et al. | 386/112 |

* cited by examiner

MULTIMEDIA TIME WARPING SYSTEM

BACKGROUND OF THE INVENTION

1. Technical Field

The invention relates to the time shifting of television broadcast signals. More particularly, the invention relates to the real time capture, storage, and display of television broadcast signals.

2. Description of the Prior Art

The Video Cassette Recorder (VCR) has changed the lives of television (TV) viewers throughout the world. The VCR has offered viewers the flexibility to time-shift TV programs to match their lifestyles.

The viewer stores TV programs onto magnetic tape using the VCR. The VCR gives the viewer the ability to play, rewind, fast forward and pause the stored program material. These functions enable the viewer to pause the program playback whenever he desires, fast forward through unwanted program material or commercials, and to replay favorite scenes. However, a VCR cannot both capture and play back information at the same time.

One approach to solving this problem is to use several VCRs. For example, if two video tape recorders are available, it might be possible to Ping-Pong between the two. In this case, the first recorder is started at the beginning of the program of interest. If the viewer wishes to rewind the broadcast, the second recorder begins recording, while the first recorder is halted, rewound to the appropriate place, and playback initiated. However, at least a third video tape recorder is required if the viewer wishes to fast forward to some point in time after the initial rewind was requested. In this case, the third recorder starts recording the broadcast stream while the second is halted and rewound to the appropriate position. Continuing this exercise, one can quickly see that the equipment becomes unwieldy, unreliable, expensive, and hard to operate, while never supporting all desired functions. In addition, tapes are of finite length, and may potentially end at inconvenient times, drastically lowering the value of the solution.

The use of digital computer systems to solve this problem has been suggested. U.S. Pat. No. 5,371,551 issued to Logan et al., on Dec. 6, 1994, teaches a method for concurrent video recording and playback. It presents a microprocessor controlled broadcast and playback device. Said device compresses and stores video data onto a hard disk. However, this approach is difficult to implement because the processor requirements for keeping up with the high video rates makes the device expensive and problematic. The microprocessor must be extremely fast to keep up with the incoming and outgoing video data.

It would be advantageous to provide a multimedia time warping system that gives the user the ability to simultaneously record and play back TV broadcast programs. It would further be advantageous to provide a multimedia time warping system that utilizes an approach that decouples the microprocessor from the high video data rates, thereby reducing the microprocessor and system requirements which are at a premium.

SUMMARY OF THE INVENTION

The invention provides a multimedia time warping system. The invention utilizes an easily manipulated, low cost multimedia storage and display system that allows the user to view a television broadcast program with the option of instantly reviewing previous scenes within the program. In addition, the invention allows the user to store selected television broadcast programs while the user is simultaneously watching or reviewing another program.

A preferred embodiment of the invention accepts television (TV) input streams in a multitude of forms, for example, analog forms such as National Television Standards Committee (NTSC) or PAL broadcast, and digital forms such as Digital Satellite System (DSS), Digital Broadcast Services (DBS), or Advanced Television Standards Committee (ATSC). Analog TV streams are converted to an Moving Pictures Experts Group (MPEG) formatted stream for internal transfer and manipulation, while pre-formatted MPEG streams are extracted from the digital TV signal and presented in a similar format to encoded analog streams.

The invention parses the resulting MPEG stream and separates it into its video and audio components. It then stores the components into temporary buffers. Events are recorded that indicate the type of component that has been found, where it is located, and when it occurred. The program logic is notified that an event has occurred and the data is extracted from the buffers.

The parser and event buffer decouple the CPU from having to parse the MPEG stream and from the real time nature of the data streams. This decoupling allows for slower CPU and bus speeds which translate to lower system costs. The video and audio components are stored on a storage device. When the program is requested for display, the video and audio components are extracted from the storage device and reassembled into an MPEG stream. The MPEG stream is sent to a decoder. The decoder converts the MPEG stream into TV output signals and delivers the TV output signals to a TV receiver.

User control commands are accepted and sent through the system. These commands affect the flow of said MPEG stream and allow the user to view stored programs with at least the following functions: reverse, fast forward, play, pause, index, fast/slow reverse play, and fast/slow play.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a multimedia time warping system. A system according to the invention provides a multimedia storage and display system that allows the user to view a television broadcast program with the option of instantly reviewing previous scenes within the program. The invention additionally provides the user with the ability to store selected television broadcast programs while simultaneously watching or reviewing another program and to view stored programs with at least the following functions: reverse, fast forward, play, pause, index, fast/slow reverse play, and fast/slow play.

Figure 1:
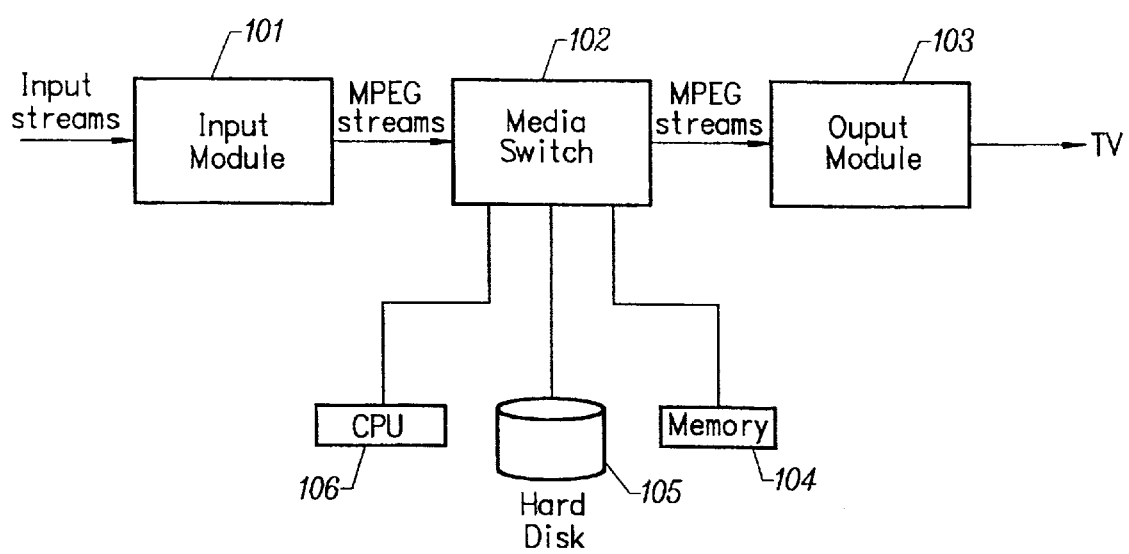
FIG. 1 is a block schematic diagram of a high level view of a preferred embodiment of the invention according to the invention.

Referring to FIG. 1, a preferred embodiment of the invention has an Input Section 101, Media Switch 102, and an Output Section 103. The Input Section 101 takes television (TV) input streams in a multitude of forms, for example, National Television Standards Committee (NTSC) or PAL broadcast, and digital forms such as Digital Satellite System (DSS), Digital Broadcast Services (DBS), or Advanced Television Standards Committee (ATSC). DBS, DSS and ATSC are based on standards called Moving Pictures Experts Group 2 (MPEG2) and MPEG2 Transport. MPEG2 Transport is a standard for formatting the digital data stream from the TV source transmitter so that a TV receiver can disassemble the input stream to find programs in the multiplexed signal. The Input Section 101 produces MPEG streams. An MPEG2 transport multiplex supports multiple programs in the same broadcast channel, with multiple video and audio feeds and private data. The Input Section 101 tunes the channel to a particular program, extracts a specific MPEG program out of it, and feeds it to the rest of the system. Analog TV signals are encoded into a similar MPEG format using separate video and audio encoders, such that the remainder of the system is unaware of how the signal was obtained. Information may be modulated into the Vertical Blanking Interval (VBI) of the analog TV signal in a number of standard ways; for example, the North American Broadcast Teletext Standard (NABTS) may be used to modulate information onto lines 10 through 20 of an NTSC signal, while the FCC mandates the use of line 21 for Closed Caption (CC) and Extended Data Services (EDS). Such signals are decoded by the input section and passed to the other sections as if they were delivered via an MPEG2 private data channel.

The Media Switch 102 mediates between a microprocessor CPU 106, hard disk or storage device 105, and memory 104. Input streams are converted to an MPEG stream and sent to the Media Switch 102. The Media Switch 102 buffers the MPEG stream into memory. It then performs two operations if the user is watching real time TV: the stream is sent to the Output Section 103 and it is written simultaneously to the hard disk or storage device 105.

The Output Section 103 takes MPEG streams as input and produces an analog TV signal according to the NTSC, PAL, or other required TV standards. The Output Section 103 contains an MPEG decoder, On-Screen Display (OSD) generator, analog TV encoder and audio logic. The OSD generator allows the program logic to supply images which will be overlayed on top of the resulting analog TV signal. Additionally, the Output Section can modulate information supplied by the program logic onto the VBI of the output signal in a number of standard formats, including NABTS, CC and EDS.

Figure 2:
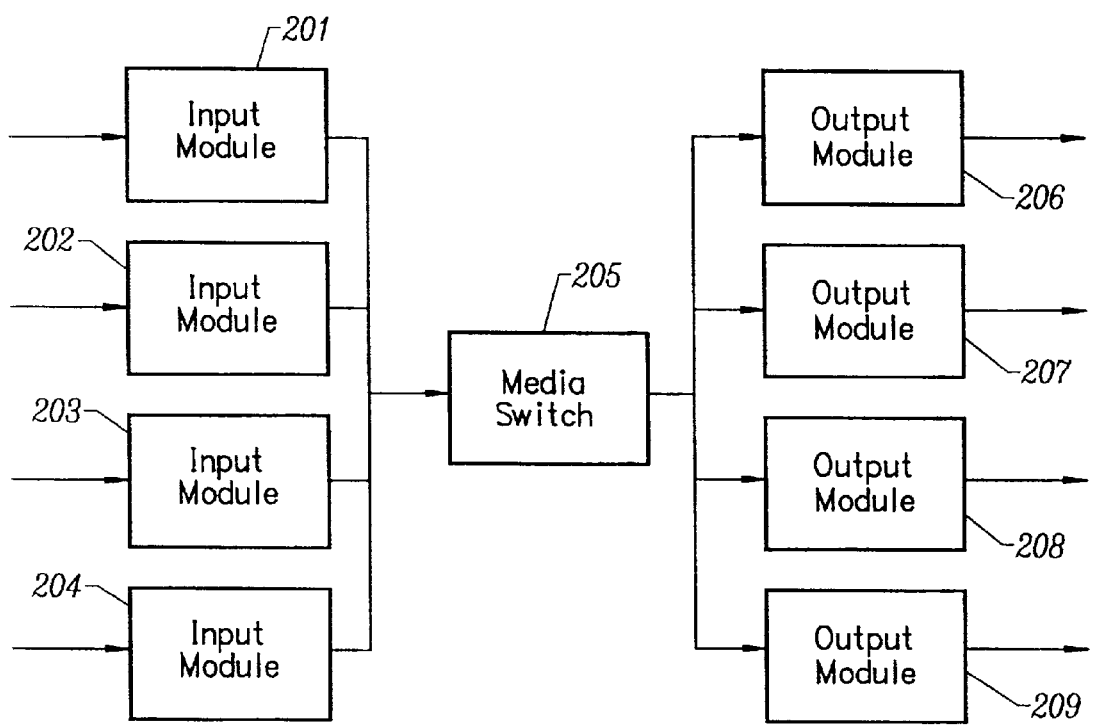
FIG. 2 is a block schematic diagram of a preferred embodiment of the invention using multiple input and output modules according to the invention.

With respect to FIG. 2, the invention easily expands to accommodate multiple Input Sections (tuners) 201, 202, 203, 204, each can be tuned to different types of input. Multiple Output Modules (decoders) 206, 207, 208, 209 are added as well. Special effects such as picture in a picture can be implemented with multiple decoders. The Media Switch 205 records one program while the user is watching another. This means that a stream can be extracted off the disk while another stream is being stored onto the disk.

Figure 3:
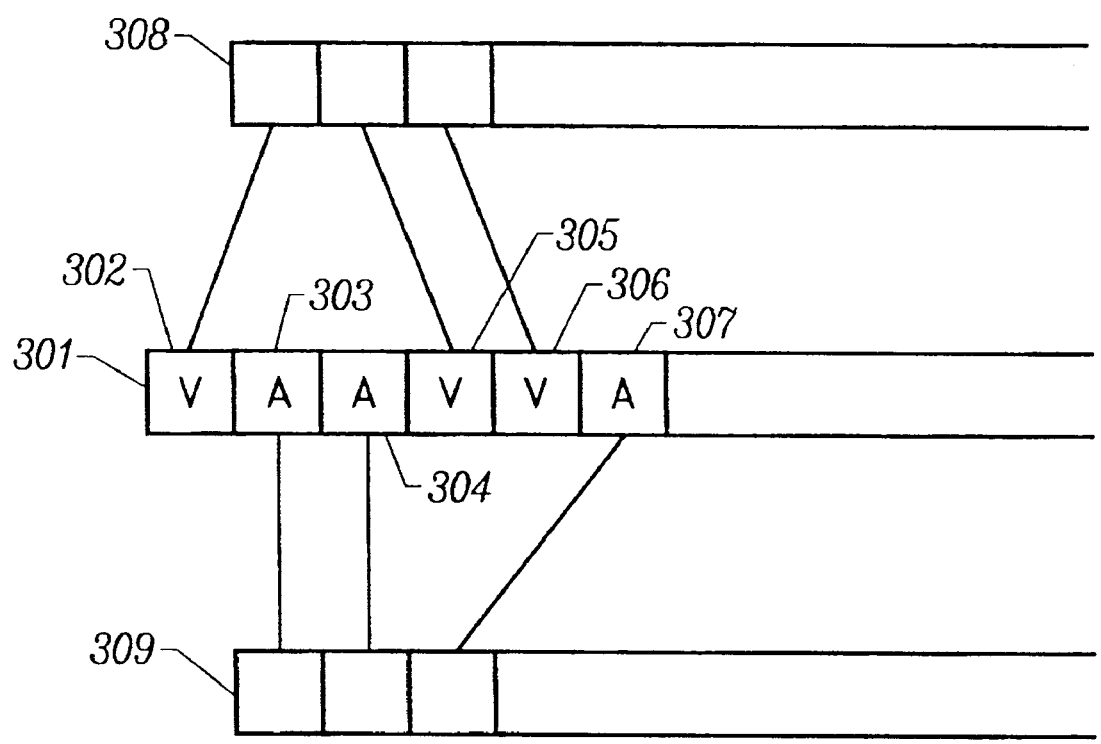
FIG. 3 is a schematic diagram of an Moving Pictures Experts Group (MPEG) data stream and its video and audio components according to the invention.

Referring to FIG. 3, the incoming MPEG stream 301 has interleaved video 302, 305, 306 and audio 303, 304, 307 segments. These elements must be separated and recombined to create separate video 308 and audio 309 streams or buffers. This is necessary because separate decoders are used to convert MPEG elements back into audio or video analog components. Such separate delivery requires that time sequence information be generated so that the decoders may be properly synchronized for accurate playback of the signal.

The Media Switch enables the program logic to associate proper time sequence information with each segment, possibly embedding it directly into the stream. The time sequence information for each segment is called a time stamp. These time stamps are monotonically increasing and start at zero each time the system boots up. This allows the invention to find any particular spot in any particular video segment. For example, if the system needs to read five seconds into an incoming contiguous video stream that is being cached, the system simply has to start reading forward into the stream and look for the appropriate time stamp.

A binary search can be performed on a stored file to index into a stream. Each stream is stored as a sequence of fixed-size segments enabling fast binary searches because of the uniform time stamping. If the user wants to start in the middle of the program, the system performs a binary search of the stored segments until it finds the appropriate spot, obtaining the desired results with a minimal amount of information. If the signal were instead stored as an MPEG stream, it would be necessary to linearly parse the stream from the beginning to find the desired location.

Figure 4:
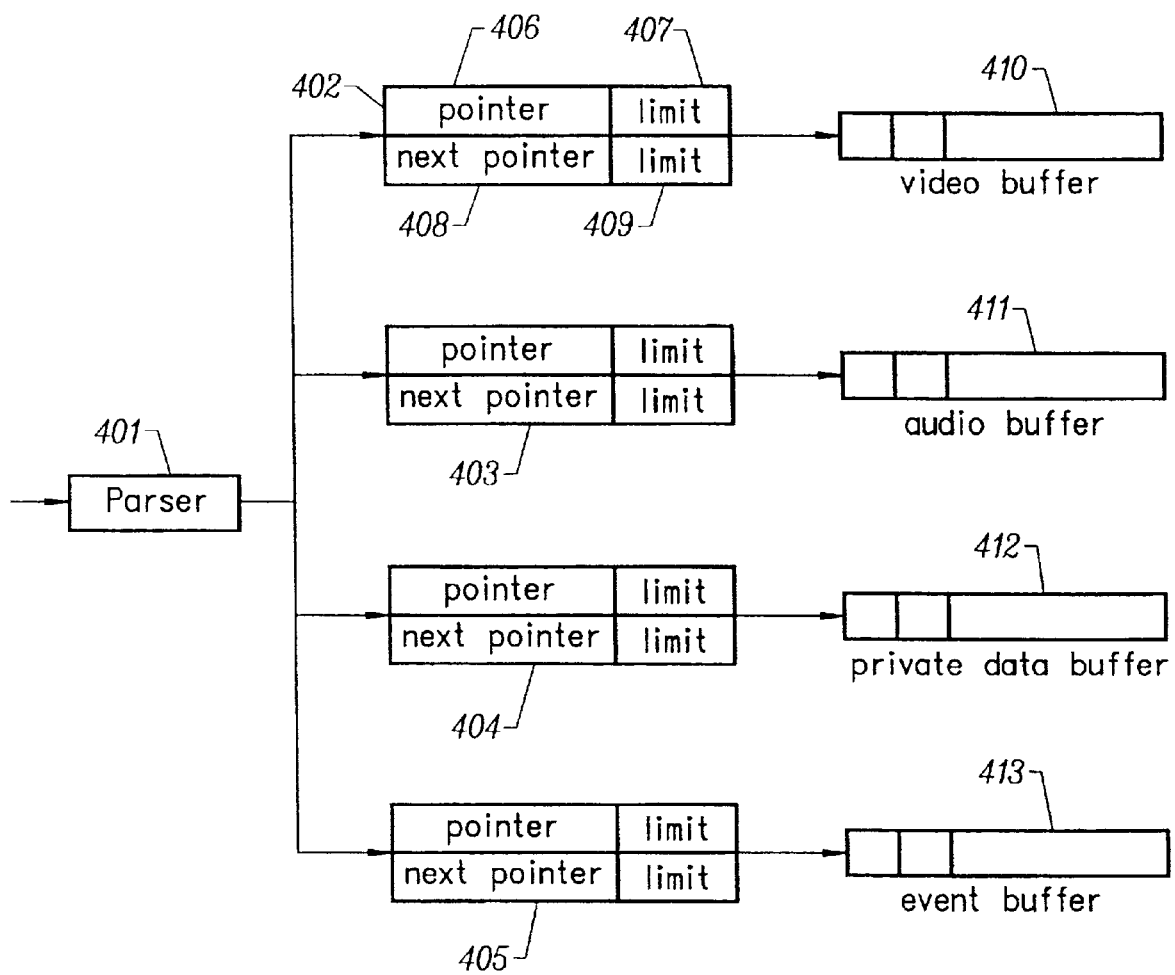
FIG. 4 is a block schematic diagram of a parser and four direct memory access (DMA) input engines contained in the Media Switch according to the invention.

With respect to FIG. 4, the Media Switch contains four input Direct Memory Access (DMA) engines 402, 403, 404, 405 each DMA engine has an associated buffer 410, 411, 412, 413. Conceptually, each DMA engine has a pointer 406, a limit for that pointer 407, a next pointer 408, and a limit for the next pointer 409. Each DMA engine is dedicated to a particular type of information, for example, video 402, audio 403, and parsed events 405. The buffers 410, 411, 412, 413 are circular and collect the specific information. The DMA engine increments the pointer 406 into the associated buffer until it reaches the limit 407 and then loads the next pointer 408 and limit 409. Setting the pointer 406 and next pointer 408 to the same value, along with the corresponding limit value creates a circular buffer. The next pointer 408 can be set to a different address to provide vector DMA.

The input stream flows through a parser 401. The parser 401 parses the stream looking for MPEG distinguished events indicating the start of video, audio or private data segments. For example, when the parser 401 finds a video event, it directs the stream to the video DMA engine 402. The parser 401 buffers up data and DMAs it into the video buffer 410 through the video DMA engine 402. At the same time, the parser 401 directs an event to the event DMA engine 405 which generates an event into the event buffer 413. When the parser 401 sees an audio event, it redirects the byte stream to the audio DMA engine 403 and generates an event into the event buffer 413. Similarly, when the parser 401 sees a private data event, it directs the byte stream to the private data DMA engine 404 and directs an event to the event buffer 413. The Media Switch notifies the program logic via an interrupt mechanism when events are placed in the event buffer.

Figure 5:
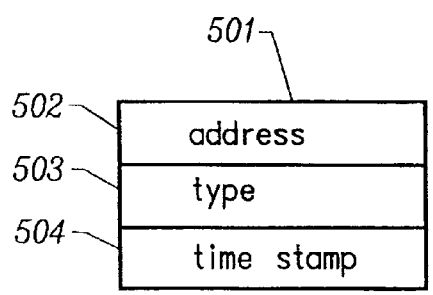
FIG. 5 is a schematic diagram of the components of a packetized elementary stream (PES) buffer according to the invention.

Referring to FIGS. 4 and 5, the event buffer 413 is filled by the parser 401 with events. Each event 501 in the event buffer has an offset 502, event type 503, and time stamp field 504. The parser 401 provides the type and offset of each event as it is placed into the buffer. For example, when an audio event occurs, the event type field is set to an audio event and the offset indicates the location in the audio buffer 411. The program logic knows where the audio buffer 411 starts and adds the offset to find the event in the stream. The address offset 502 tells the program logic where the next event occurred, but not where it ended. The previous event is cached so the end of the current event can be found as well as the length of the segment.

Figure 6:
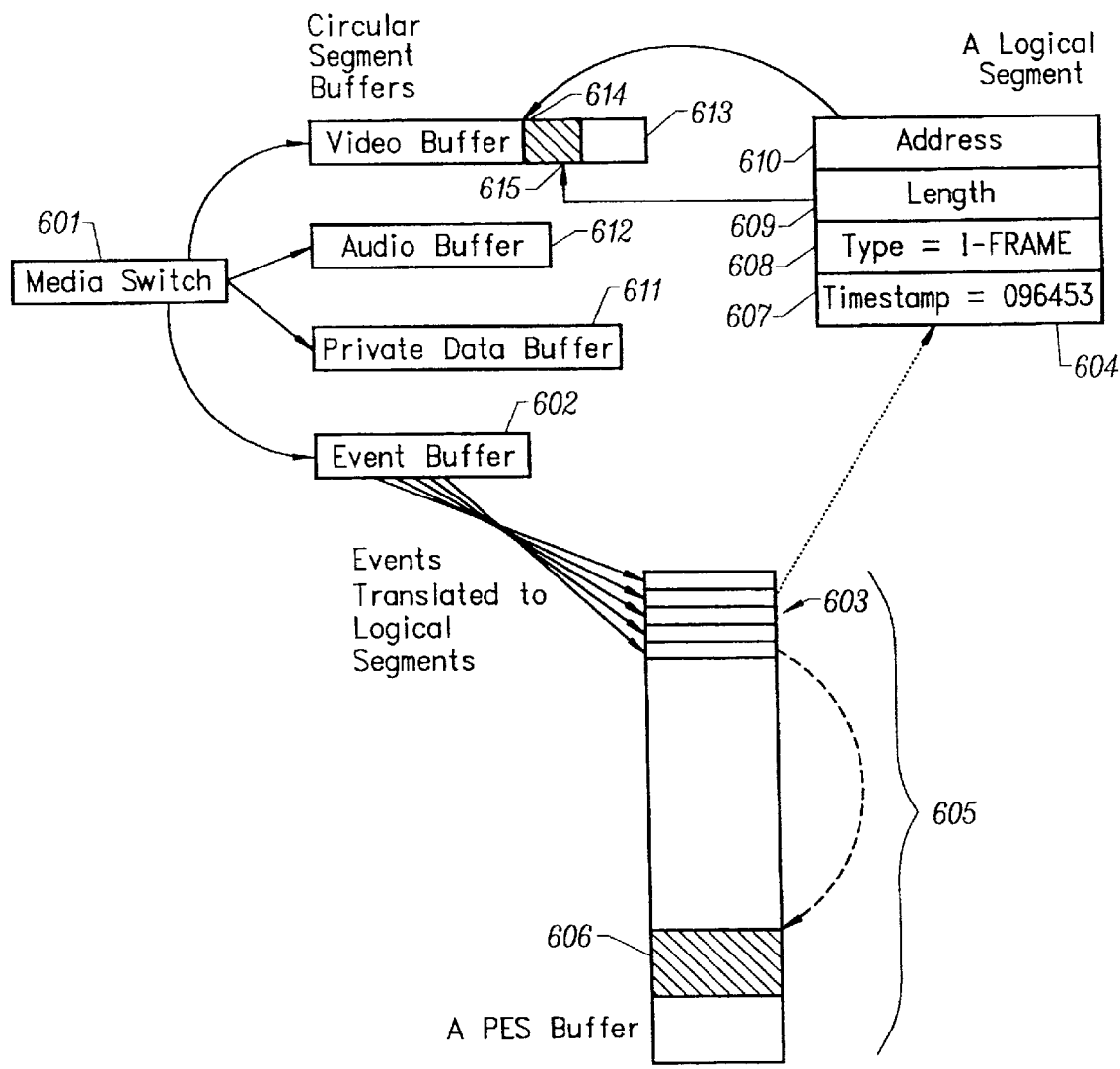
FIG. 6 is a schematic diagram of the construction of a PES buffer from the parsed components in the Media Switch output circular buffers.

With respect to FIGS. 5 and 6, the program logic reads accumulated events in the event buffer 602 when it is interrupted by the Media Switch 601. From these events the program logic generates a sequence of logical segments 603 which correspond to the parsed MPEG segments 615. The program logic converts the offset 502 into the actual address 610 of each segment, and records the event length 609 using the last cached event. If the stream was produced by encoding an analog signal, it will not contain Program Time Stamp (PTS) values, which are used by the decoders to properly present the resulting output. Thus, the program logic uses the generated time stamp 504 to calculate a simulated PTS for each segment and places that into the logical segment time stamp 607. In the case of a digital TV stream, PTS values are already encoded in the stream. The program logic extracts this information and places it in the logical segment time stamp 607.

The program logic continues collecting logical segments 603 until it reaches the fixed buffer size. When this occurs, the program logic generates a new buffer, called a Packetized Elementary Stream (PES) 605 buffer containing these logical segments 603 in order, plus ancillary control information. Each logical segment points 604 directly to the circular buffer, e.g., the video buffer 613, filled by the Media Switch 601. This new buffer is then passed to other logic components, which may further process the stream in the buffer in some way, such as presenting it for decoding or writing it to the storage media. Thus, the MPEG data is not copied from one location in memory to another by the processor. This results in a more cost effective design since lower memory bandwidth and processor bandwidth is required.

A unique feature of the MPEG stream transformation into PES buffers is that the data associated with logical segments need not be present in the buffer itself, as presented above. When a PES buffer is written to storage, these logical segments are written to the storage medium in the logical order in which they appear. This has the effect of gathering components of the stream, whether they be in the video, audio or private data circular buffers, into a single linear buffer of stream data on the storage medium. The buffer is read back from the storage medium with a single transfer from the storage media, and the logical segment information is updated to correspond with the actual locations in the buffer 606. Higher level program logic is unaware of this transformation, since it handles only the logical segments, thus stream data is easily managed without requiring that the data ever be copied between locations in DRAM by the CPU.

A unique aspect of the Media Switch is the ability to handle high data rates effectively and inexpensively. It performs the functions of taking video and audio data in, sending video and audio data out, sending video and audio data to disk, and extracting video and audio data from the disk on a low cost platform. Generally, the Media Switch runs asynchronously and autonomously with the microprocessor CPU, using its DMA capabilities to move large quantities of information with minimal intervention by the CPU.

Figure 7:
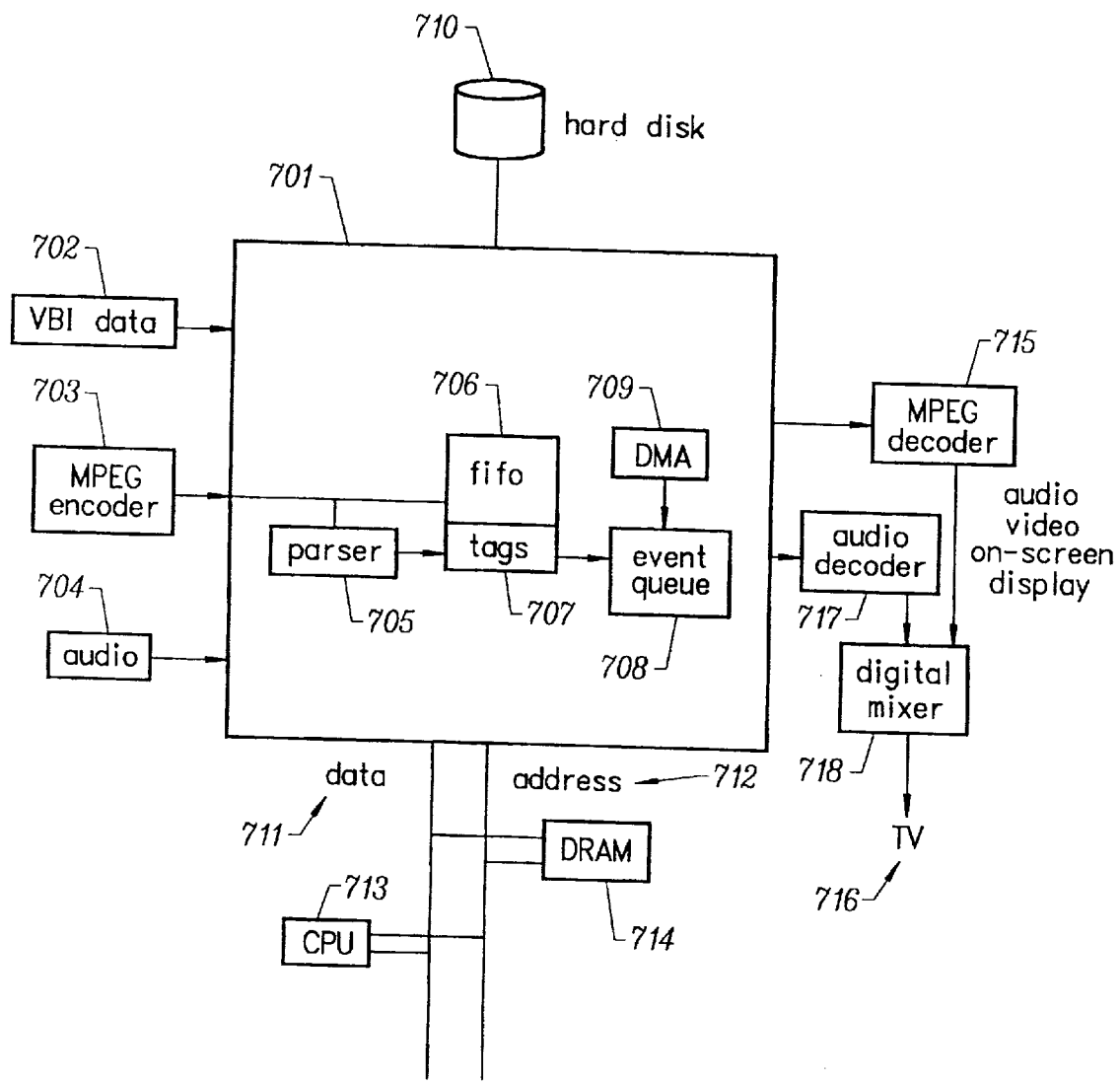
FIG. 7 is a block schematic diagram of the Media Switch and the various components that it communicates with according to the invention.

Referring to FIG. 7, the input side of the Media Switch 701 is connected to an MPEG encoder 703. There are also circuits specific to MPEG audio 704 and vertical blanking interval (VBI) data 702 feeding into the Media Switch 701. If a digital TV signal is being processed instead, the MPEG encoder 703 is replaced with an MPEG2 Transport Demultiplexor, and the MPEG audio encoder 704 and VBI decoder 702 are deleted. The demultiplexor multiplexes the extracted audio, video and private data channel streams through the video input Media Switch port.

The parser 705 parses the input data stream from the MPEG encoder 703, audio encoder 704 and VBI decoder 702, or from the transport demultiplexor in the case of a digital TV stream. The parser 705 detects the beginning of all of the important events in a video or audio stream, the start of all of the frames, the start of sequence headers—all of the pieces of information that the program logic needs to know about in order to both properly play back and perform special effects on the stream, e.g. fast forward, reverse, play, pause, fast/slow play, indexing, and fast/slow reverse play.

The parser 705 places tags 707 into the FIFO 706 when it identifies video or audio segments, or is given private data. The DMA 709 controls when these tags are taken out. The tags 707 and the DMA addresses of the segments are placed into the event queue 708. The frame type information, whether it is a start of a video I-frame, video B-frame, video P-frame, video PES, audio PES, a sequence header, an audio frame, or private data packet, is placed into the event queue 708 along with the offset in the related circular buffer where the piece of information was placed. The program logic operating in the CPU 713 examines events in the circular buffer after it is transferred to the DRAM 714.

The Media Switch 701 has a data bus 711 that connects to the CPU 713 and DRAM 714. An address bus 712 is also shared between the Media Switch 701, CPU 713, and DRAM 714. A hard disk or storage device 710 is connected to one of the ports of the Media Switch 701. The Media Switch 701 outputs streams to an MPEG video decoder 715 and a separate audio decoder 717. The audio decoder 717 signals contain audio cues generated by the system in response to the user's commands on a remote control or other internal events. The decoded audio output from the MPEG decoder is digitally mixed 718 with the separate audio signal. The resulting signals contain video, audio, and on-screen displays and are sent to the TV 716.

The Media Switch 701 takes in 8-bit data and sends it to the disk, while at the same time extracts another stream of data off of the disk and sends it to the MPEG decoder 715. All of the DMA engines described above can be working at the same time. The Media Switch 701 can be implemented in hardware using a Field Programmable Gate Array (FPGA), ASIC, or discrete logic.

Rather than having to parse through an immense data stream looking for the start of where each frame would be, the program logic only has to look at the circular event buffer in DRAM 714 and it can tell where the start of each frame is and the frame type. This approach saves a large amount of CPU power, keeping the real time requirements of the CPU 713 small. The CPU 713 does not have to be very fast at any point in time. The Media Switch 701 gives the CPU 713 as much time as possible to complete tasks. The parsing mechanism 705 and event queue 708 decouple the CPU 713 from parsing the audio, video, and buffers and the real time nature of the streams, which allows for lower costs. It also allows the use of a bus structure in a CPU environment that operates at a much lower clock rate with much cheaper memory than would be required otherwise.

The CPU 713 has the ability to queue up one DMA transfer and can set up the next DMA transfer at its leisure. This gives the CPU 713 large time intervals within which it can service the DMA controller 709. The CPU 713 may respond to a DMA interrupt within a larger time window because of the large latency allowed. MPEG streams, whether extracted from an MPEG2 Transport or encoded from an analog TV signal, are typically encoded using a technique called Variable Bit Rate encoding (VBR). This technique varies the amount of data required to represent a sequence of images by the amount of movement between those images. This technique can greatly reduce the required bandwidth for a signal, however sequences with rapid movement (such as a basketball game) may be encoded with much greater bandwidth requirements. For example, the Hughes DirecTV satellite system encodes signals with anywhere from 1 to 10 Mb/s of required bandwidth, varying from frame to frame. It would be difficult for any computer system to keep up with such rapidly varying data rates without this structure.

Figure 8:
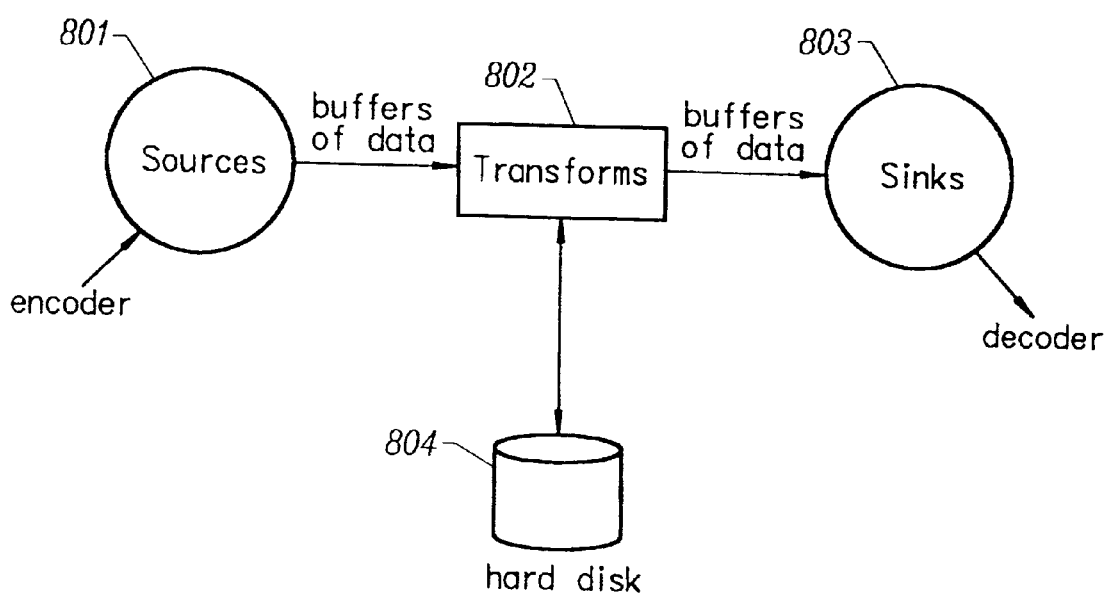
FIG. 8 is a block schematic diagram of a high level view of the program logic according to the invention.

With respect to FIG. 8, the program logic within the CPU has three conceptual components: sources 801, transforms 802, and sinks 803. The sources 801 produce buffers of data. Transforms 802 process buffers of data and sinks 803 consume buffers of data. A transform is responsible for allocating and queuing the buffers of data on which it will operate. Buffers are allocated as if "empty" to sources of data, which give them back "full". The buffers are then queued and given to sinks as "full", and the sink will return the buffer "empty".

A source 801 accepts data from encoders, e.g., a digital satellite receiver. It acquires buffers for this data from the downstream transform, packages the data into a buffer, then pushes the buffer down the pipeline as described above. The source object 801 does not know anything about the rest of the system. The sink 803 consumes buffers, taking a buffer from the upstream transform, sending the data to the decoder, and then releasing the buffer for reuse.

There are two types of transforms 802 used: spatial and temporal. Spatial transforms are transforms that perform, for example, an image convolution or compression/decompression on the buffered data that is passing through. Temporal transforms are used when there is no time relation that is expressible between buffers going in and buffers coming out of a system. Such a transform writes the buffer to a file 804 on the storage medium. The buffer is pulled out at a later time, sent down the pipeline, and properly sequenced within the stream.

Figure 9:
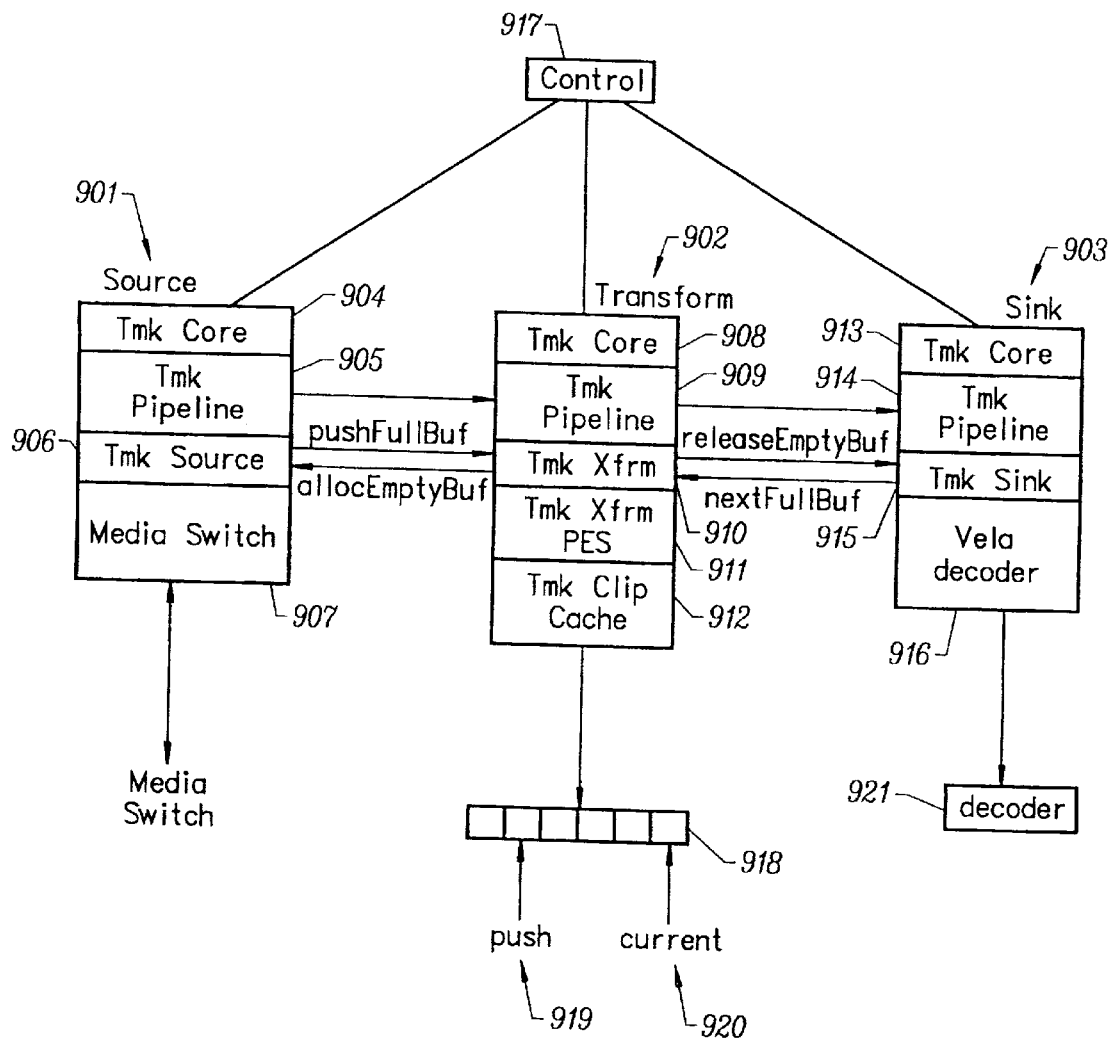
FIG. 9 is a block schematic diagram of a class hierarchy of the program logic according to the invention.

Referring to FIG. 9, a C++ class hierarchy derivation of the program logic is shown. The TiVo Media Kernel (Tmk) 904, 908, 913 mediates with the operating system kernel. The kernel provides operations such as: memory allocation, synchronization, and threading. The TmkCore 904, 908, 913 structures memory taken from the media kernel as an object. It provides operators, new and delete, for constructing and deconstructing the object. Each object (source 901, transform 902, and sink 903) is multi-threaded by definition and can run in parallel.

The TmkPipeline class 905, 909, 914 is responsible for flow control through the system. The pipelines point to the next pipeline in the flow from source 901 to sink 903. To pause the pipeline, for example, an event called "pause" is sent to the first object in the pipeline. The event is relayed on to the next object and so on down the pipeline. This all happens asynchronously to the data going through the pipeline. Thus, similar to applications such as telephony, control of the flow of MPEG streams is asynchronous and separate from the streams themselves. This allows for a simple logic design that is at the same time powerful enough to support the features described previously, including pause, rewind, fast forward and others. In addition, this structure allows fast and efficient switching between stream sources, since buffered data can be simply discarded and decoders reset using a single event, after which data from the new stream will pass down the pipeline. Such a capability is needed, for example, when switching the channel being captured by the input section, or when switching between a live signal from the input section and a stored stream.

The source object 901 is a TmkSource 906 and the transform object 902 is a TmkXfrm 910. These are intermediate classes that define standard behaviors for the classes in the pipeline. Conceptually, they handshake buffers down the pipeline. The source object 901 takes data out of a physical data source, such as the Media Switch, and places it into a PES buffer. To obtain the buffer, the source object 901 asks the down stream object in his pipeline for a buffer (allocEmptyBuf). The source object 901 is blocked until there is sufficient memory. This means that the pipeline is self-regulating; it has automatic flow control. When the source object 901 has filled up the buffer, it hands it back to the transform 902 through the pushFullBuf function.

The sink 903 is flow controlled as well. It calls nextFullBuf which tells the transform 902 that it is ready for the next filled buffer. This operation can block the sink 903 until a buffer is ready. When the sink 903 is finished with a buffer (i.e., it has consumed the data in the buffer) it calls releaseEmptyBuf. ReleaseEmptyBuf gives the buffer back to the transform 902. The transform 902 can then hand that buffer, for example, back to the source object 901 to fill up again. In addition to the automatic flow-control benefit of this method, it also provides for limiting the amount of memory dedicated to buffers by allowing enforcement of a fixed allocation of buffers by a transform. This is an important feature in achieving a cost-effective limited DRAM environment.

The MediaSwitch class 909 calls the allocEmptyBuf method of the TmkClipCache 912 object and receives a PES buffer from it. It then goes out to the circular buffers in the Media Switch hardware and generates PES buffers. The MediaSwitch class 909 fills the buffer up and pushes it back to the TmkClipCache 912 object.

The TmkClipCache 912 maintains a cache file 918 on a storage medium. It also maintains two pointers into this cache: a push pointer 919 that shows where the next buffer coming from the source 901 is inserted; and a current pointer 920 which points to the current buffer used.

The buffer that is pointed to by the current pointer is handed to the Vela decoder class 916. The Vela decoder class 916 talks to the decoder 921 in the hardware. The decoder 921 produces a decoded TV signal that is subsequently encoded into an analog TV signal in NTSC, PAL or other analog format. When the Vela decoder class 916 is finished with the buffer it calls releaseEmptyBuf.

The structure of the classes makes the system easy to test and debug. Each level can be tested separately to make sure it performs in the appropriate manner, and the classes may be gradually aggregated to achieve the desired functionality while retaining the ability to effectively test each object.

The control object 917 accepts commands from the user and sends events into the pipeline to control what the pipeline is doing. For example, if the user has a remote control and is watching TV, the user presses pause and the control object 917 sends an event to the sink 903, that tells it pause. The sink 903 stops asking for new buffers. The current pointer 920 stays where it is at. The sink 903 starts taking buffers out again when it receives another event that tells it to play. The system is in perfect synchronization; it starts from the frame that it stopped at.

The remote control may also have a fast forward key. When the fast forward key is pressed, the control object 917 sends an event to the transform 902, that tells it to move forward two seconds. The transform 902 finds that the two second time span requires it to move forward three buffers. It then issues a reset event to the downstream pipeline, so that any queued data or state that may be present in the hardware decoders is flushed. This is a critical step, since the structure of MPEG streams requires maintenance of state across multiple frames of data, and that state will be rendered invalid by repositioning the pointer. It then moves the current pointer 920 forward three buffers. The next time the sink 903 calls nextFullBuf it gets the new current buffer. The same method works for fast reverse in that the transform 902 moves the current pointer 920 backwards.

A system clock reference resides in the decoder. The system clock reference is sped up for fast play or slowed down for slow play. The sink simply asks for full buffers faster or slower, depending on the clock speed.

Figure 10:
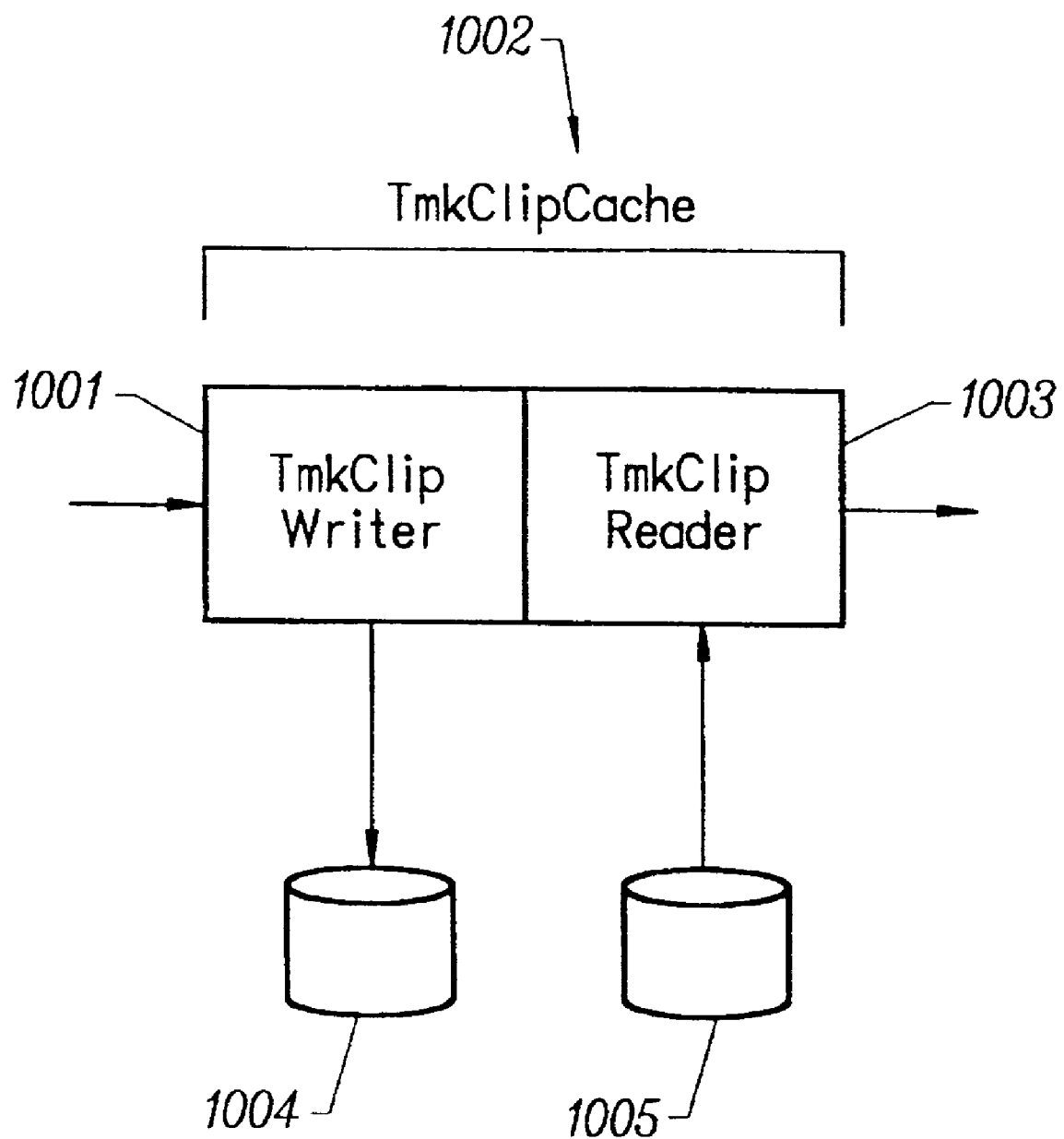
FIG. 10 is a block schematic diagram of a preferred embodiment of the clip cache component of the invention according to the invention.

With respect to FIG. 10, two other objects derived from the TmkXfrm class are placed in the pipeline for disk access. One is called TmkClipReader 1003 and the other is called TmkClipWriter 1001. Buffers come into the TmkClipWriter 1001 and are pushed to a file on a storage medium 1004. TmkClipReader 1003 asks for buffers which are taken off of a file on a storage medium 1005. A TmkClipReader 1003 provides only the allocEmptyBuf and pushFullBuf methods, while a TmkClipWriter 1001 provides only the nextFullBuf and releaseEmptyBuf methods. A TmkClipReader 1003 therefore performs the same function as the input, or "push" side of a TmkClipCache 1002, while a TmkClipWriter 1001 therefore performs the same function as the output, or "pull" side of a TmkClipCache 1002.

Figure 11:
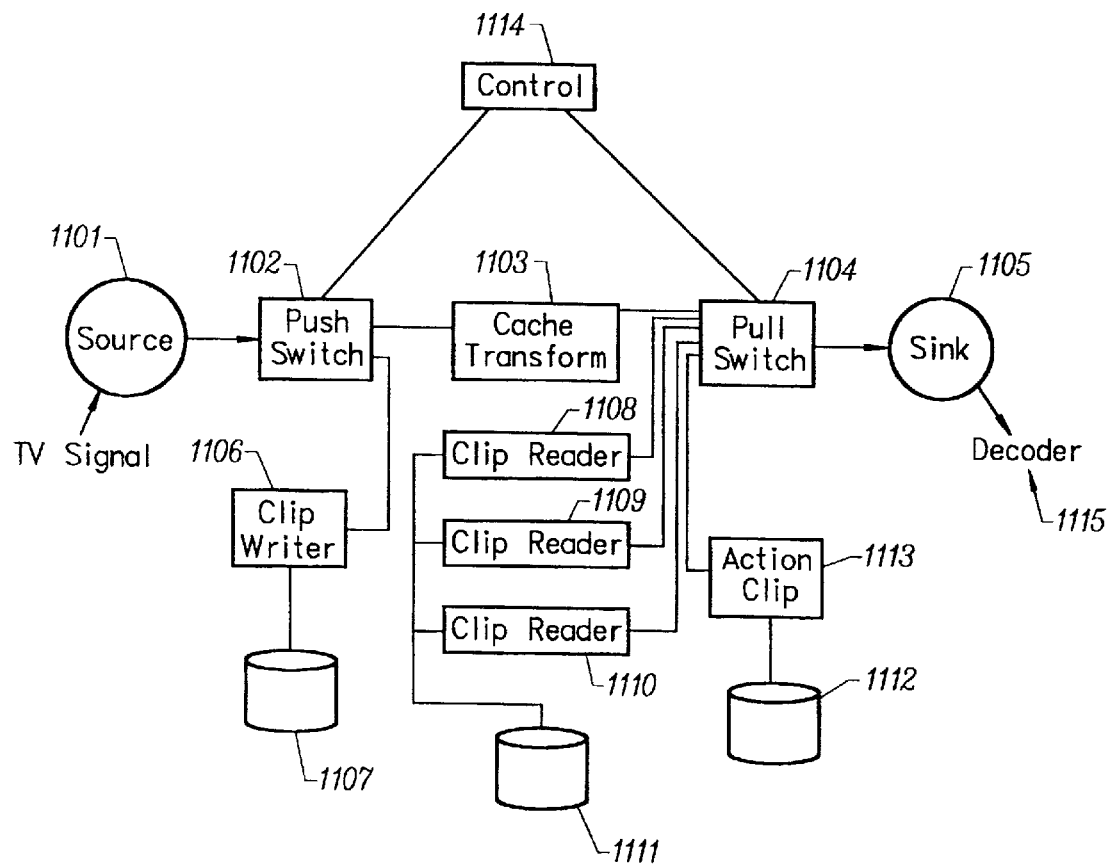
FIG. 11 is a block schematic diagram of a preferred embodiment of the invention that emulates a broadcast studio video mixer according to the invention.

Referring to FIG. 11, a preferred embodiment that accomplishes multiple functions is shown. A source 1101 has a TV signal input. The source sends data to a PushSwitch 1102 which is a transform derived from TmkXfrm. The PushSwitch 1102 has multiple outputs that can be switched by the control object 1114. This means that one part of the pipeline can be stopped and another can be started at the users whim. The user can switch to different storage devices. The PushSwitch 1102 could output to a TmkClipWriter 1106, which goes onto a storage device 1107 or write to the cache transform 1103.

An important feature of this apparatus is the ease with which it can selectively capture portions of an incoming signal under the control of program logic. Based on information such as the current time, or perhaps a specific time span, or perhaps via a remote control button press by the viewer, a TmkClipWriter 1106 may be switched on to record a portion of the signal, and switched off at some later time. This switching is typically caused by sending a "switch" event to the PushSwitch 1102 object.

An additional method for triggering selective capture is through information modulated into the VBI or placed into an MPEG private data channel. Data decoded from the VBI or private data channel is passed to the program logic. The program logic examines this data to determine if the data indicates that capture of the TV signal into which it was modulated should begin. Similarly, this information may also indicate when recording should end, or another data item may be modulated into the signal indicating when the capture should end. The starting and ending indicators may be explicitly modulated into the signal or other information that is placed into the signal in a standard fashion may be used to encode this information.

Figure 12:
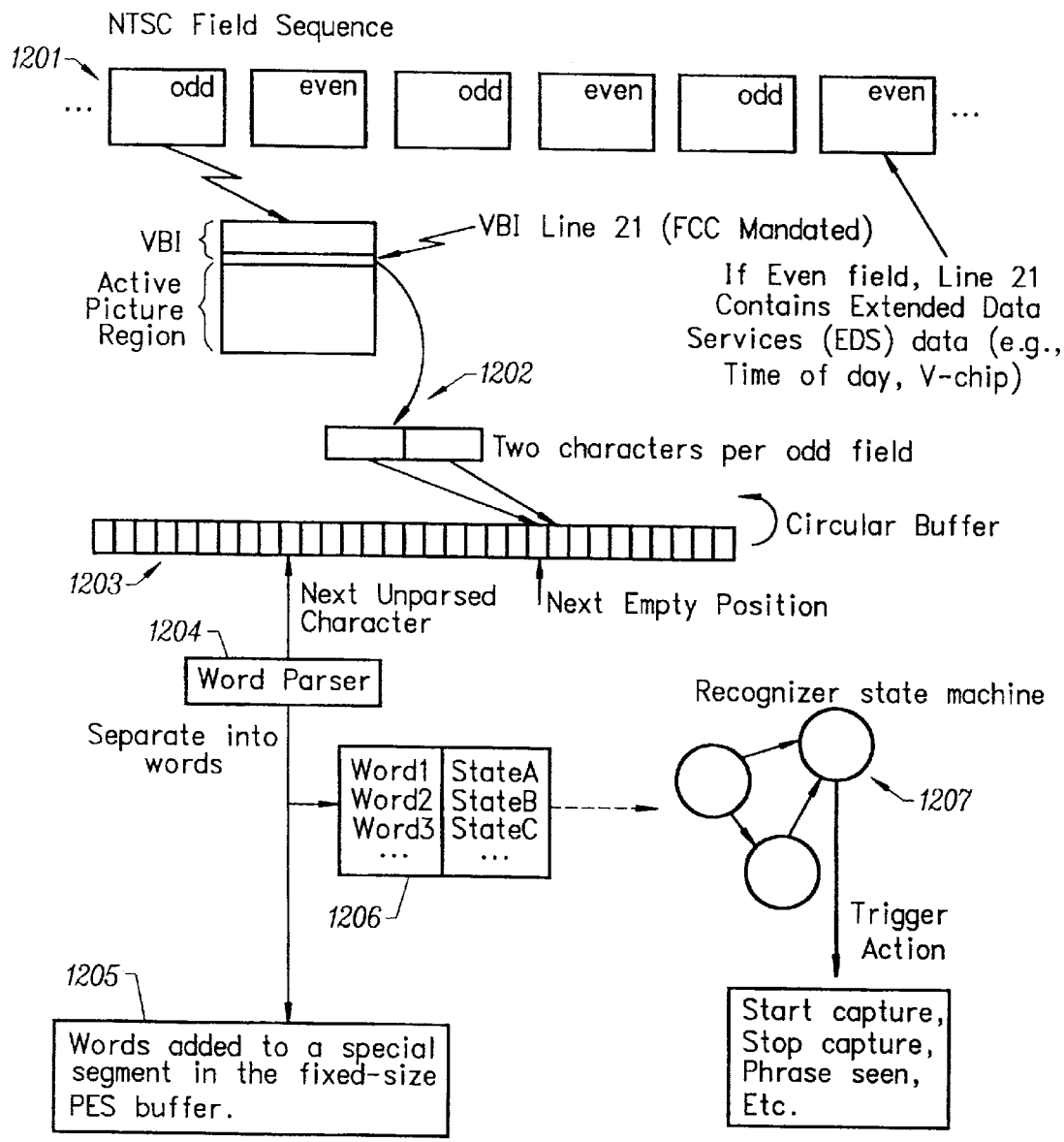
FIG. 12 is a block schematic diagram of a closed caption parser according to the invention.

With respect to FIG. 12, an example is shown which demonstrates how the program logic scans the words contained within the closed caption (CC) fields to determine starting and ending times, using particular words or phrases to trigger the capture. A stream of NTSC or PAL fields 1201 is presented. CC bytes are extracted from each odd field 1202, and entered in a circular buffer 1203 for processing by the Word Parser 1204. The Word Parser 1204 collects characters until it encounters a word boundary, usually a space, period or other delineating character. Recall from above, that the MPEG audio and video segments are collected into a series of fixed-size PES buffers. A special segment is added to each PES buffer to hold the words extracted from the CC field 1205. Thus, the CC information is preserved in time synchronization with the audio and video, and can be correctly presented to the viewer when the stream is displayed. This also allows the stored stream to be processed for CC information at the leisure of the program logic, which spreads out load, reducing cost and improving efficiency. In such a case, the words stored in the special segment are simply passed to the state table logic 1206.

During stream capture, each word is looked up in a table 1206 which indicates the action to take on recognizing that word. This action may simply change the state of the recognizer state machine 1207, or may cause the state machine 1207 to issue an action request, such as "start capture", "stop capture", "phrase seen", or other similar requests. Indeed, a recognized word or phrase may cause the pipeline to be switched; for example, to overlay a different audio track if undesirable language is used in the program.

Note that the parsing state table 1206 and recognizer state machine 1207 may be modified or changed at any time. For example, a different table and state machine may be provided for each input channel. Alternatively, these elements may be switched depending on the time of day, or because of other events.

Referring to FIG. 11, a PullSwitch is added 1104 which outputs to the sink 1105.

The sink 1105 calls nextFullBuf and releaseEmptyBuf to get or return buffers from the PullSwitch 1104. The PullSwitch 1104 can have any number of inputs. One input could be an ActionClip 1113. The remote control can switch between input sources. The control object 1114 sends an event to the PullSwitch 1104, telling it to switch. It will switch from the current input source to whatever input source the control object selects.

An ActionClip class provides for sequencing a number of different stored signals in a predictable and controllable manner, possibly with the added control of viewer selection via a remote control. Thus, it appears as a derivative of a TmkXfrm object that accepts a "switch" event for switching to the next stored signal.

This allows the program logic or user to create custom sequences of video output. Any number of video segments can be lined up and combined as if the program logic or user were using a broadcast studio video mixer. TmkClipReaders 1108, 1109, 1110 are allocated and each is hooked into the PullSwitch 1104. The PullSwitch 1104 switches between the TmkClipReaders 1108, 1109, 1110 to combine video and audio clips. Flow control is automatic because of the way the pipeline is constructed. The Push and Pull Switches are the same as video switches in a broadcast studio.

The derived class and resulting objects described here may be combined in an arbitrary way to create a number of different useful configurations for storing, retrieving, switching and viewing of TV streams. For example, if multiple input and output sections are available, one input is viewed while another is stored, and a picture-in-picture window generated by the second output is used to preview previously stored streams. Such configurations represent a unique and novel application of software transformations to achieve the functionality expected of expensive, sophisticated hardware solutions within a single cost-effective device.

Figure 13:
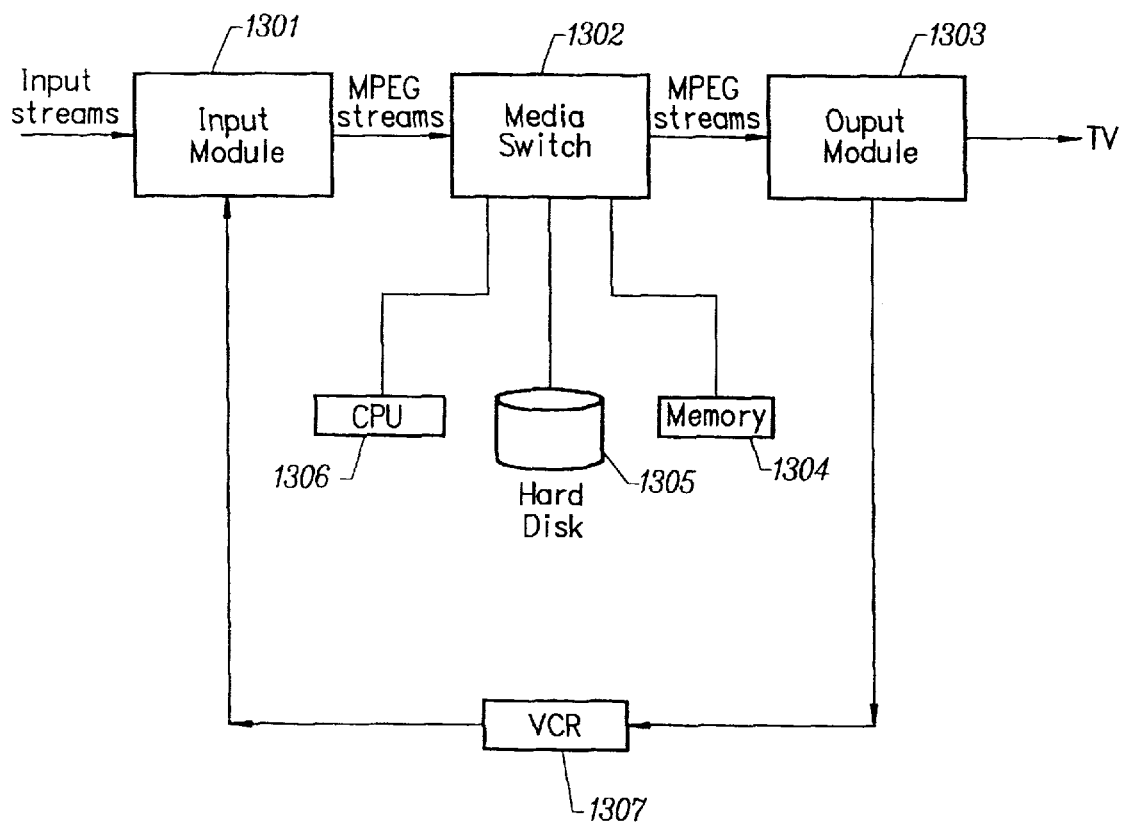
FIG. 13 is a block schematic diagram of a high level view of a preferred embodiment of the invention utilizing a VCR as an integral component of the invention according to the invention.

With respect to FIG. 13, a high-level system view is shown which implements a VCR backup. The Output Module 1303 sends TV signals to the VCR 1307. This allows the user to record TV programs directly on to video tape. The invention allows the user to queue up programs from disk to be recorded on to video tape and to schedule the time that the programs are sent to the VCR 1307. Title pages (EPG data) can be sent to the VCR 1307 before a program is sent. Longer programs can be scaled to fit onto smaller video tapes by speeding up the play speed or dropping frames.

The VCR 1307 output can also be routed back into the Input Module 1301. In this configuration the VCR acts as a backup system for the Media Switch 1302. Any overflow storage or lower priority programming is sent to the VCR 1307 for later retrieval.

The Input Module 1301 can decode and pass to the remainder of the system information encoded on the Vertical Blanking Interval (VBI). The Output Module 1303 can encode into the output VBI data provided by the remainder of the system. The program logic may arrange to encode identifying information of various kinds into the output signal, which will be recorded onto tape using the VCR 1307. Playing this tape back into the input allows the program logic to read back this identifying information, such that the TV signal recorded on the tape is properly handled. For example, a particular program may be recorded to tape along with information about when it was recorded, the source network, etc. When this program is played back into the Input Module, this information can be used to control storage of the signal, presentation to the viewer, etc.

One skilled in the art will readily appreciate that such a mechanism may be used to introduce various data items to the program logic which are not properly conceived of as television signals. For instance, software updates or other data may be passed to the system. The program logic receiving this data from the television stream may impose controls on how the data is handled, such as requiring certain authentication sequences and/or decrypting the embedded information according to some previously acquired key. Such a method works for normal broadcast signals as well, leading to an efficient means of providing non-TV control information and data to the program logic.

Additionally, one skilled in the art will readily appreciate that although a VCR is specifically mentioned above, any multimedia recording device (e.g., a Digital Video Disk-Random Access Memory (DVD-RAM) recorder) is easily substituted in its place.

Although the invention is described herein with reference to the preferred embodiment, one skilled in the art will readily appreciate that other applications may be substituted for those set forth herein without departing from the spirit and scope of the present invention. For example, the invention can be used in the detection of gambling casino crime. The input section of the invention is connected to the casino's video surveillance system. Recorded video is cached and simultaneously output to external VCRs. The user can switch to any video feed and examine (i.e., rewind, play, slow play, fast forward, etc.) a specific segment of the recorded video while the external VCRs are being loaded with the real-time input video. Accordingly, the invention should only be limited by the claims included below.

What is claimed is:

1. A process for the simultaneous storage and play back of multimedia data, comprising the steps of:

accepting television (TV) broadcast signals, wherein said TV signals are based on a multitude of standards, including, but not limited to, National Television Standards Committee (NTSC) broadcast, PAL broadcast, satellite transmission, DSS, DBS, or ATSC;

tuning said TV signals to a specific program;

providing at least one Input Section, wherein said Input Section converts said specific program to an Moving Pictures Experts Group (MPEG) formatted stream for internal transfer and manipulation;

providing a Media Switch, wherein said Media Switch parses said MPEG stream, said MPEG stream is separated into its video and audio components;

storing said video and audio components on a storage device;

providing at least one Output Section, wherein said Output Section extracts said video and audio components from said storage device;

wherein said Output Section assembles said video and audio components into an MPEG stream;

wherein said Output Section sends said MPEG stream to a decoder;

wherein said decoder converts said MPEG stream into TV output signals;

wherein said decoder delivers said TV output signals to a TV receiver; and accepting control commands from a user, wherein said control commands are sent through the system and affect the flow of said MPEG stream.

2. The process of claim 1, wherein said Input Section directs said MPEG stream to the destination indicated by said control commands.

3. The process of claim 1, wherein said Output Section extracts said video and audio components from the storage device indicated by said control commands.

4. The process of claim 1, further comprising the step of:
creating custom video output sequences, wherein said sequences are specified by a user or program control.

5. The process of claim 1, wherein the storing and extracting of said video and audio components from said storage device are performed simultaneously.

6. The process of claim 1, wherein said Media Switch calculates and logically associates a time stamp to said video and audio components.

7. The process of claim 1, wherein said Media Switch extracts time stamp values from a digital TV stream and logically associates said time stamp values to said video and audio components.

8. The process of claim 1, further comprising the steps of:
placing said video component into a circular video buffer;
posting an event in a circular event buffer, wherein said event contains an indication that a video component was found and the location of said video component in said circular video buffer; and
sending notice of said event posting.

9. The process of claim 1, further comprising the steps of:
placing said audio component into a circular audio buffer;
posting an event in a circular event buffer, wherein said event contains an indication that an audio component was found and the location of said audio component in said circular audio buffer; and
sending notice of said event posting.

10. The process of claims 8 or 9, further comprising the steps of:
receiving said notice;
retrieving said event posting from said event buffer; and
indexing into the appropriate buffer indicated by the type and location information in said event buffer.

11. The process of claim 10, further comprising the steps of:
generating a buffer containing the logical audio or video segments in order, including ancillary information, wherein each of said logical segments points to the appropriate circular buffer location where corresponding audio or video components have been placed.

12. The process of claim 1, further comprising the step of:
increasing the decoder system clock rate for fast playback or fast reverse playback.

13. The process of claim 1, further comprising the step of:
decreasing the decoder system clock rate for slow playback or slow reverse playback.

14. The process of claim 1, further comprising the step of:
combining system audio cues and on-screen displays with said TV output signals.

15. The process of claim 1, further comprising the steps of:
decoding the Vertical Blanking Interval (VBI) data or private data channel information from said TV signal; and
examining said data to determine the starting or ending indicators of a specific program.

16. The process of claim 1, further comprising the step of:
scanning the words contained within the closed caption (CC) fields to determine program starting and ending times, wherein particular words or phrases are used to trigger the recording of a specific program and wherein the CC information is preserved in time synchronization with the audio and video, and can be correctly presented to the viewer when the stream is displayed.

17. The process of claim 16, further comprising the step of:
performing a specific action when a specific word is found in said CC information.

18. The process of claim 1, wherein said Media Switch has a data bus connecting it to a CPU and DRAM.

19. The process of claim 1, wherein said Media Switch shares an address bus with a CPU and DRAM.

20. The process of claim 1, wherein said Media Switch operates asychronously and autonomously with a CPU.

21. The process of claim 1, wherein said storage device is connected to said Media Switch.

22. The process of claim 1, wherein said Media Switch allows the CPU to queue up Direct Memory Access (DMA) transfers.

23. The process of claim 1, wherein said Media Switch is implemented in hardware.

24. The process of claim 1, further comprising the step of:
providing a multimedia recording device, including, but not limited to, a Video Cassette Recorder (VCR) or a Digital Video Disk-Random Access Memory (DVD-RAM) device, wherein said recording device is attached to the output side of said decoder, allowing said user to record said TV output signals.

25. The process of claim 24, wherein said user queues up programs from said storage device to be stored on said recording device.

26. The process of claim 24, wherein said user sets time schedules for said programs to be sent to said recording device.

27. The process of claim 24, wherein title pages may be sent to said recording device before sending a program to be stored on said recording device.

28. The process of claim 24, wherein a program that is longer in duration than a magnetic tape in said recording device allows, is sped up to fit within the desired time limit.

29. The process of claim 24, wherein a program that is longer in duration than a magnetic tape in said recording device allows, has frames dropped from it to fit within the desired time limit.

30. The process of claim 24, wherein the output of said recording device is routed to said Input Section, allowing said recording device to act as a storage back up system, said recording device accepts overflow storage, TV programs, software updates, or other data that are later retrieved and sent to said Input Section.

31. A process for the simultaneous storage and play back of multimedia data, comprising the steps of:
providing a physical data source, wherein said physical data source accepts broadcast data from an input device, parses video and audio data from said broadcast data, and temporarily stores said video and audio data;
providing a source object, wherein said source object extracts video and audio data from said physical data source;
providing a transform object, wherein said transform object stores and retrieves data streams onto a storage device;
wherein said source object obtains a buffer from said transform object, said source object converts video data into data streams and fills said buffer with said streams;

wherein said source object is automatically flow controlled by said transform object;

providing a sink object, wherein said sink object obtains data stream buffers from said transform object and outputs said streams to a video and audio decoder;

wherein said decoder converts said streams into display signals and sends said signals to a display;

wherein said sink object is automatically flow controlled by said transform object;

providing a control object, wherein said control object receives commands from a user, said commands control the flow of the broadcast data through the system; and wherein said control object sends flow command events to said source, transform, and sink objects.

32. An apparatus for the simultaneous storage and play back of multimedia data, comprising:

a module for accepting television (TV) broadcast signals, wherein said TV signals are based on a multitude of standards, including, but not limited to, National Television Standards Committee (NTSC) broadcast, PAL broadcast, satellite transmission, DSS, DBS, or ATSC;

a module for tuning said TV signals to a specific program;

at least one Input Section, wherein said Input Section converts said specific program to an Moving Pictures Experts Group (MPEG) formatted stream for internal transfer and manipulation;

a Media Switch, wherein said Media Switch parses said MPEG stream, said MPEG stream is separated into its video and audio components;

a module for storing said video and audio components on a storage device;

at least one Output Section, wherein said Output Section extracts said video and audio components from said storage device;

wherein said Output Section assembles said video and audio components into an MPEG stream;

wherein said Output Section sends said MPEG stream to a decoder;

wherein said decoder converts said MPEG stream into TV output signals;

wherein said decoder delivers said TV output signals to a TV receiver; and accepting control commands from a user, wherein said control commands are sent through the system and affect the flow of said MPEG stream.

33. The apparatus of claim 32, wherein said Input Section directs said MPEG stream to the destination indicated by said control commands.

34. The apparatus of claim 32, wherein said Output Section extracts said video and audio components from the storage device indicated by said control commands.

35. The apparatus of claim 32, further comprising:
a module for creating custom video output sequences, wherein said sequences are specified by a user or program control.

36. The apparatus of claim 32, wherein the storing and extracting of said video and audio components from said storage device are performed simultaneously.

37. The apparatus of claim 32, wherein said Media Switch calculates and logically associates a time stamp to said video and audio components.

38. The apparatus of claim 32, wherein said Media Switch extracts time stamp values from a digital TV stream and logically associates said time stamp values to said video and audio components.

39. The apparatus of claim 32, further comprising:
a module for placing said video component into a circular video buffer;
a module for posting an event in a circular event buffer, wherein said event contains an indication that a video component was found and the location of said video component in said circular video buffer; and
a module for sending notice of said event posting.

40. The apparatus of claim 32, further comprising:
a module for placing said audio component into a circular audio buffer;
a module for posting an event in a circular event buffer, wherein said event contains an indication that an audio component was found and the location of said audio component in said circular audio buffer; and
a module for sending notice of said event posting.

41. The apparatus of claims 39 or 40, further comprising:
a module for receiving said notice;
a module for retrieving said event posting from said event buffer; and
a module for indexing into the appropriate buffer indicated by the type and location information in said event buffer.

42. The apparatus of claim 41, further comprising:
a module for generating a buffer containing the logical audio or video segments in order, including ancillary information, wherein each of said logical segments points to the appropriate circular buffer location where corresponding audio or video components have been placed.

43. The apparatus of claim 32, further comprising:
a module for increasing the decoder system clock rate for fast playback or fast reverse playback.

44. The apparatus of claim 32, further comprising:
a module for decreasing the decoder system clock rate for slow playback or slow reverse playback.

45. The apparatus of claim 32, further comprising:
a module for combining system audio cues and on-screen displays with said TV output signals.

46. The apparatus of claim 32, further comprising:
a module for decoding the Vertical Blanking Interval (VBI) data or private data channel information from said TV signal; and
a module for examining said data to determine the starting or ending indicators of a specific program.

47. The apparatus of claim 32, further comprising:
a module for scanning the words contained within the closed caption (CC) fields to determine program starting and ending times, wherein particular words or phrases are used to trigger the recording of a specific program and wherein the CC information is preserved in time synchronization with the audio and video, and can be correctly presented to the viewer when the stream is displayed.

48. The apparatus of claim 47, further comprising:
a module for performing a specific action when a specific word is found in said CC information.

49. The apparatus of claim 32, wherein said Media Switch has a data bus connecting it to a CPU and DRAM.

50. The apparatus of claim 32, wherein said Media Switch shares an address bus with a CPU and DRAM.

51. The apparatus of claim 32, wherein said Media Switch operates asychronously and autonomously with a CPU.

52. The apparatus of claim 32, wherein said storage device is connected to said Media Switch.

53. The apparatus of claim 32, wherein said Media Switch allows the CPU to queue up Direct Memory Access (DMA) transfers.

54. The apparatus of claim 32, further comprising:

a multimedia recording device, including, but not limited to, a Video Cassette Recorder (VCR) or a Digital Video Disk-Random Access Memory (DVD-RAM) device, wherein said recording device is attached to the output side of said decoder, allowing said user to record said TV output signals.

55. The apparatus of claim 54, wherein said user queues up programs from said storage device to be stored on said recording device.

56. The apparatus of claim 54, wherein said user sets time schedules for said programs to be sent to said recording device.

57. The apparatus of claim 54, wherein title pages may be sent to said recording device before sending a program to be stored on said recording device.

58. The apparatus of claim 54, wherein a program that is longer in duration than a magnetic tape in said recording device allows, is sped up to fit within the desired time limit.

59. The apparatus of claim 54, wherein a program that is longer in duration than a magnetic tape in said recording device allows, has frames dropped from it to fit within the desired time limit.

60. The apparatus of claim 54, wherein the output of said recording device is routed to said Input Section, allowing said recording device to act as a storage back up system, said recording device accepts overflow storage, TV programs, software updates, or other data that are later retrieved and sent to said Input Section.

61. An apparatus for the simultaneous storage and play back of multimedia data, comprising:

a physical data source, wherein said physical data source accepts broadcast data from an input device, parses video and audio data from said broadcast data, and temporarily stores said video and audio data;

a source object, wherein said source object extracts video and audio data from said physical data source;

a transform object, wherein said transform object stores and retrieves data streams onto a storage device;

wherein said source object obtains a buffer from said transform object, said source object converts video data into data streams and fills said buffer with said streams;

wherein said source object is automatically flow controlled by said transform object;

a sink object, wherein said sink object obtains data stream buffers from said transform object and outputs said streams to a video and audio decoder;

wherein said decoder converts said streams into display signals and sends said signals to a display;

wherein said sink object is automatically flow controlled by said transform object;

a control object, wherein said control object receives commands from a user, said commands control the flow of the broadcast data through the system; and wherein said control object sends flow command events to said source, transform, and sink objects.

\* \* \* \* \*

(12) EX PARTE REEXAMINATION CERTIFICATE (6516th)
United States Patent
Barton et al.

(10) Number: US 6,233,389 C1
(45) Certificate Issued: Nov. 11, 2008

(54) MULTIMEDIA TIME WARPING SYSTEM

(75) Inventors: James M. Barton, Los Gatos, CA (US); Roderick James McInnis, Milpitas, CA (US); Alan S. Moskowitz, San Francisco, CA (US); Andrew Martin Goodman, Menlo Park, CA (US); Ching Tong Chow, Fremont, CA (US); Jean Swey Kao, Cupertino, CA (US)

(73) Assignee: TiVo, Inc., Sunnyvale, CA (US)

Reexamination Request:
No. 90/007,750, Oct. 17, 2005

Reexamination Certificate for:
Patent No.: 6,233,389
Issued: May 15, 2001
Appl. No.: 09/126,071
Filed: Jul. 30, 1998

(51) Int. Cl.
*H04N 5/91* (2006.01)

(52) U.S. Cl. ............ 386/46; 386/68; 386/E5.043; 386/E5.07; 348/E5.007; 348/E5.108

(58) Field of Classification Search ............ 386/46, 386/E5.007, E5.108, 86, E5.043, E5.07
See application file for complete search history.

(56) References Cited

U.S. PATENT DOCUMENTS

| | | | |
|---|---|---|---|
| 3,682,363 | A | 8/1972 | Hull |
| 3,942,190 | A | 3/1976 | Detweiler |
| 4,141,039 | A | 2/1979 | Yamamoto |

(Continued)

FOREIGN PATENT DOCUMENTS

DE 44 34 034 A1 3/1996

(Continued)

OTHER PUBLICATIONS

Ramanathan et al, "Toward personalized multimedia dial–up services", Computer Networks and ISDN Systems Jul. 26, 1994, No. 10, Amsterdam, NL.*

(Continued)

*Primary Examiner*—Ovidio Escalante

(57) ABSTRACT

A multimedia time warping system. The invention allows the user to store selected television broadcast programs while the user is simultaneously watching or reviewing another program. A preferred embodiment of the invention accepts television (TV) input streams in a multitude of forms, for example, National Television Standards Committee (NTSC) or PAL broadcast, and digital forms such as Digital Satellite (DSS), Digital Broadcast Services (DBS), or Advanced Television Standards Committee (ATSC). The TV streams are converted to an Moving Pictures Experts Group (MPEG) formatted stream for internal transfer and manipulation and are parsed and separated it into video and audio components. The components are stored in temporary buffers. Events are recorded that indicate the type of component that has been found, where it is located, and when it occurred. The program logic is notified that an event has occurred and the data is extracted from the buffers. The parser and event buffer decouple the CPU from having to parse the MPEG stream and from the real time nature of the data streams which allows for slower CPU and bus speeds and translate to lower system costs. The video and audio components are stored on a storage device and when the program is requested for display, the video and audio components are extracted from the storage device and reassembled into an MPEG stream which is sent to a decoder. The decoder converts the MPEG stream into TV output signals and delivers the TV output signals to a TV receiver. User control commands are accepted and sent through the system. These commands affect the flow of said MPEG stream and allow the user to view stored programs with at least the following functions: reverse, fast forward, play, pause, index, fast/slow reverse play, and fast/slow play.

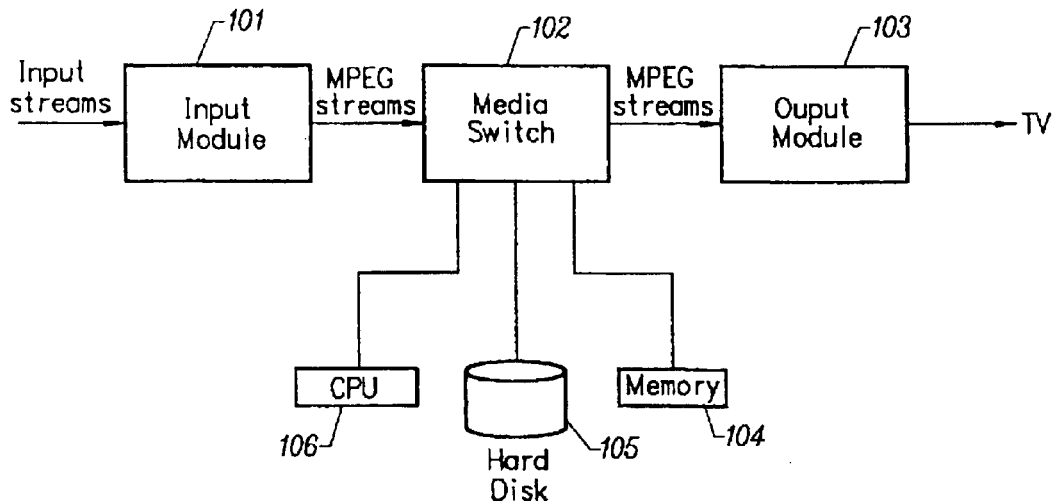

U.S. PATENT DOCUMENTS

| | | |
|---|---|---|
| 4,224,481 A | 9/1980 | Russell |
| 4,258,418 A | 3/1981 | Heath |
| 4,313,135 A | 1/1982 | Cooper |
| 4,347,527 A | 8/1982 | Lainez |
| 4,388,659 A | 6/1983 | Lemke |
| 4,408,309 A | 10/1983 | Kiesling et al. |
| 4,423,480 A | 12/1983 | Bauer et al. |
| 4,439,785 A | 3/1984 | Leonard |
| 4,506,348 A | 3/1985 | Miller et al. |
| 4,506,358 A | 3/1985 | Montgomery |
| 4,602,297 A | 7/1986 | Reese |
| 4,633,331 A | 12/1986 | McGrady et al. |
| 4,665,431 A | 5/1987 | Cooper |
| 4,688,106 A | 8/1987 | Keller et al. |
| 4,689,022 A | 8/1987 | Peers et al. |
| 4,706,121 A | 11/1987 | Young |
| 4,723,181 A | 2/1988 | Hickok |
| 4,752,834 A | 6/1988 | Koombes |
| 4,755,889 A | 7/1988 | Schwartz |
| 4,760,442 A | 7/1988 | O'Connell et al. |
| 4,761,684 A | 8/1988 | Clark et al. |
| 4,789,961 A | 12/1988 | Tindall |
| 4,805,217 A | 2/1989 | Morihiro et al. |
| 4,816,905 A | 3/1989 | Tweedy et al. |
| 4,821,121 A | 4/1989 | Beaulier |
| 4,833,710 A | 5/1989 | Hirashima |
| 4,876,670 A | 10/1989 | Nakabayashi et al. |
| 4,891,715 A | 1/1990 | Levy |
| 4,897,867 A | 1/1990 | Foster et al. |
| 4,920,533 A | 4/1990 | Dufresne et al. |
| 4,924,387 A | 5/1990 | Jeppesen |
| 4,939,594 A | 7/1990 | Moxon et al. |
| 4,947,244 A | 8/1990 | Fenwick et al. |
| 4,949,169 A | 8/1990 | Lumelsky et al. |
| 4,949,187 A | 8/1990 | Cohen |
| 4,963,866 A | 10/1990 | Duncan |
| 4,963,995 A | 10/1990 | Lang |
| 4,972,396 A | 11/1990 | Rafner |
| 4,979,050 A | 12/1990 | Westland et al. |
| RE33,535 E | 2/1991 | Cooper |
| 4,991,033 A | 2/1991 | Takeshita |
| 5,001,568 A | 3/1991 | Efron et al. |
| 5,014,125 A | 5/1991 | Pocock et al. |
| 5,018,186 A | 5/1991 | Kimura et al. |
| 5,019,900 A | 5/1991 | Clark et al. |
| 5,021,893 A | 6/1991 | Scheffler |
| 5,027,241 A | 6/1991 | Hatch et al. |
| 5,027,400 A | 6/1991 | Baji et al. |
| 5,047,857 A | 9/1991 | Duffield et al. |
| 5,057,932 A | 10/1991 | Lang |
| 5,063,453 A | 11/1991 | Yoshimura et al. |
| 5,089,885 A | 2/1992 | Clark |
| 5,093,718 A | 3/1992 | Hoarty et al. |
| 5,109,281 A | 4/1992 | Koberi et al. |
| 5,118,105 A | 6/1992 | Brim et al. |
| 5,121,476 A | 6/1992 | Yee |
| 5,126,852 A | 6/1992 | Nishino et al. |
| 5,126,982 A | 6/1992 | Yifrach |
| 5,130,792 A | 7/1992 | Tindell et al. |
| 5,132,992 A | 7/1992 | Yurt |
| 5,134,499 A | 7/1992 | Sata et al. |
| 5,142,532 A | 8/1992 | Adams |
| 5,153,726 A | 10/1992 | Billing |
| 5,168,353 A | 12/1992 | Walker et al. |
| 5,172,413 A | 12/1992 | Bradley et al. |
| 5,202,761 A | 4/1993 | Cooper |
| 5,208,665 A | 5/1993 | McCalley et al. |
| 5,214,768 A | 5/1993 | Martin et al. |
| 5,226,141 A | 7/1993 | Esbensen |
| 5,227,876 A | 7/1993 | Cucchi et al. |
| 5,233,423 A | 8/1993 | Jernigan et al. |
| 5,233,603 A | 8/1993 | Tekeuchi et al. |
| 5,237,648 A | 8/1993 | Mills et al. |
| 5,241,428 A | 8/1993 | Goldwasser et al. |
| 5,245,430 A | 9/1993 | Nishimura |
| 5,247,347 A | 9/1993 | Litteral et al. |
| 5,251,009 A | 10/1993 | Bruno |
| 5,253,275 A | 10/1993 | Yurt et al. |
| 5,283,659 A | 2/1994 | Akiyama et al. |
| 5,285,272 A | 2/1994 | Bradley et al. |
| 5,287,182 A | 2/1994 | Haskell et al. |
| 5,311,423 A | 5/1994 | Clark |
| 5,317,603 A | 5/1994 | Osterweil |
| 5,317,604 A | 5/1994 | Osterweil |
| 5,329,307 A * | 7/1994 | Takemura et al. ........... 347/151 |
| 5,329,320 A | 7/1994 | Yifrach |
| 5,357,276 A | 10/1994 | Banker et al. |
| 5,361,261 A | 11/1994 | Edem et al. |
| 5,371,551 A | 12/1994 | Logan et al. |
| 5,412,416 A | 5/1995 | Nemirofsky |
| 5,414,455 A | 5/1995 | Hooper et al. |
| 5,428,731 A | 6/1995 | Powers |
| 5,438,423 A | 8/1995 | Lynch et al. |
| 5,440,334 A | 8/1995 | Walters et al. |
| 5,442,390 A | 8/1995 | Hooper et al. |
| 5,452,006 A * | 9/1995 | Auld ..................... 375/240.26 |
| 5,477,263 A | 12/1995 | O'Callaghan |
| 5,481,542 A | 1/1996 | Logston et al. |
| 5,488,409 A | 1/1996 | Yuen et al. |
| 5,506,615 A | 4/1996 | Awaji |
| 5,508,940 A | 4/1996 | Rossmere et al. |
| 5,513,011 A | 4/1996 | Matsumoto |
| 5,513,306 A | 4/1996 | Mills et al. |
| 5,519,684 A | 5/1996 | Iizuka et al. |
| 5,521,630 A | 5/1996 | Chen et al. |
| 5,528,281 A | 6/1996 | Grady et al. |
| 5,528,282 A | 6/1996 | Voeten et al. |
| 5,537,157 A * | 7/1996 | Washino et al. ............. 348/722 |
| 5,550,594 A | 8/1996 | Cooper et al. |
| 5,550,982 A | 8/1996 | Long et al. |
| 5,555,463 A | 9/1996 | Staron |
| 5,559,999 A | 9/1996 | Maturi |
| 5,563,714 A * | 10/1996 | Inoue et al. ................... 386/66 |
| 5,572,261 A | 11/1996 | Cooper |
| 5,577,190 A | 11/1996 | Peters |
| 5,581,479 A | 12/1996 | McLaughlin et al. |
| 5,583,561 A | 12/1996 | Baker et al. |
| 5,583,652 A | 12/1996 | Ware |
| 5,586,264 A | 12/1996 | Belknap et al. |
| 5,600,364 A | 2/1997 | Hendricks et al. |
| 5,603,058 A | 2/1997 | Belknap et al. |
| 5,604,544 A | 2/1997 | Bertram |
| 5,612,749 A | 3/1997 | Bacher et al. |
| 5,614,940 A | 3/1997 | Cobbley et al. |
| 5,615,401 A | 3/1997 | Harscoet et al. |
| 5,619,247 A | 4/1997 | Russo |
| 5,619,337 A * | 4/1997 | Naimpally ................... 386/83 |
| 5,625,464 A | 4/1997 | Compoint et al. |
| 5,629,732 A | 5/1997 | Moskowitz et al. |
| 5,635,984 A | 6/1997 | Lee |
| 5,642,171 A * | 6/1997 | Baumgartner et al. ....... 348/515 |
| 5,648,824 A | 7/1997 | Dunn et al. |
| 5,659,539 A | 8/1997 | Porter |
| 5,664,044 A | 9/1997 | Ware |
| 5,668,948 A | 9/1997 | Belknap et al. |
| 5,675,388 A | 10/1997 | Cooper |
| 5,696,866 A | 12/1997 | Iggulden et al. |
| 5,696,868 A | 12/1997 | Kim et al. |
| 5,701,383 A | 12/1997 | Russo |
| 5,706,388 A | 1/1998 | Isaka |
| 5,712,976 A | 1/1998 | Falcon, Jr. et al. |

| | | |
|---|---|---|
| 5,715,356 A | 2/1998 | Hirayama et al. |
| 5,719,982 A | 2/1998 | Kawamura et al. |
| 5,721,815 A | 2/1998 | Ottesen et al. |
| 5,721,878 A | 2/1998 | Ottensen et al. |
| 5,724,474 A | 3/1998 | Oguro et al. |
| 5,729,741 A * | 3/1998 | Liaguno et al. .......... 707/104.1 |
| 5,751,282 A | 5/1998 | Girard et al. |
| 5,751,338 A | 5/1998 | Ludwig et al. |
| 5,751,371 A | 5/1998 | Shintani |
| 5,751,883 A | 5/1998 | Ottensen et al. |
| 5,754,254 A | 5/1998 | Kobayashi et al. |
| 5,761,166 A | 6/1998 | Sedimayr et al. |
| 5,761,417 A | 6/1998 | Henley et al. |
| 5,771,334 A | 6/1998 | Yamauchi et al. |
| 5,774,170 A | 6/1998 | Hite et al. |
| 5,774,186 A | 6/1998 | Brodsky et al. |
| 5,778,137 A | 7/1998 | Nielsen et al. |
| 5,787,225 A | 7/1998 | Honjo |
| 5,805,763 A | 9/1998 | Lawler et al. |
| 5,805,821 A | 9/1998 | Saxena et al. |
| 5,808,607 A | 9/1998 | Brady et al. |
| 5,815,689 A | 9/1998 | Shaw |
| 5,822,493 A | 10/1998 | Uehara et al. |
| 5,852,705 A | 12/1998 | Hanko et al. |
| 5,864,682 A | 1/1999 | Porter et al. |
| 5,870,553 A | 2/1999 | Shaw et al. |
| 5,889,915 A | 3/1999 | Hewton |
| 5,892,884 A | 4/1999 | Sugiyama et al. |
| 5,899,578 A | 5/1999 | Yanagihara et al. |
| 5,920,572 A | 7/1999 | Washington et al. |
| 5,920,842 A | 7/1999 | Cooper et al. |
| 5,930,444 A | 7/1999 | Camhi et al. |
| 5,949,948 A | 9/1999 | Krause et al. |
| 5,949,954 A | 9/1999 | Young et al. |
| 5,956,716 A | 9/1999 | Kenner et al. |
| 5,963,202 A | 10/1999 | Polish |
| 5,973,679 A | 10/1999 | Abbott et al. |
| 5,991,496 A | 11/1999 | Kojitma |
| 5,995,709 A | 11/1999 | Tsuge |
| 5,999,691 A | 12/1999 | Takagi |
| 6,002,832 A | 12/1999 | Yoneda |
| 6,005,562 A | 12/1999 | Shiga et al. |
| 6,005,564 A | 12/1999 | Ahmad |
| 6,018,612 A | 1/2000 | Thomason et al. |
| 6,028,599 A | 2/2000 | Yuen et al. |
| RE36,801 E | 8/2000 | Logan et al. |
| 6,112,226 A | 8/2000 | Weaver et al. |
| 6,138,147 A | 10/2000 | Weaver et al. |
| 6,141,385 A | 10/2000 | Yamaji et al. |
| 6,151,059 A | 11/2000 | Schein et al. |
| 6,154,771 A | 11/2000 | Rangan et al. |
| 6,163,644 A | 12/2000 | Owashi et al. |
| 6,167,083 A | 12/2000 | Sporer |
| 6,169,843 B1 | 1/2001 | Lenihan et al. |
| 6,192,189 B1 | 2/2001 | Fujinami et al. |
| 6,198,877 B1 | 3/2001 | Kawamura et al. |
| 6,226,447 B1 | 5/2001 | Sasaki |
| 6,229,532 B1 | 5/2001 | Fujii |
| 6,233,389 B1 | 5/2001 | Barton et al. |
| 6,243,741 B1 | 6/2001 | Utsumi |
| 6,249,641 B1 | 6/2001 | Yokota |
| 6,253,375 B1 | 6/2001 | Gordon et al. |
| 6,256,704 B1 | 7/2001 | Hlava et al. |
| 6,272,672 B1 | 8/2001 | Conway |
| 6,278,837 B1 | 8/2001 | Yasukohchi et al. |
| 6,285,824 B1 | 9/2001 | Yanagihara et al. |
| 6,292,618 B1 | 9/2001 | Ohara et al. |
| 6,292,619 B1 | 9/2001 | Fujita et al. |
| 6,301,711 B1 | 10/2001 | Nusbickel |
| 6,304,714 B1 | 10/2001 | Krause et al. |
| 6,330,675 B1 | 12/2001 | Wiser et al. |
| 6,341,195 B1 | 1/2002 | Mankovitz et al. |
| 6,400,407 B1 | 6/2002 | Zigmond et al. |
| 6,424,791 B1 | 7/2002 | Saib |
| 6,445,738 B1 | 9/2002 | Zdepski |
| 6,445,872 B1 | 9/2002 | Sano et al. |
| 6,498,894 B2 | 12/2002 | Ito et al. |
| 6,504,990 B1 | 1/2003 | Abecassis |
| 6,516,467 B1 * | 2/2003 | Schindler et al. ............ 725/153 |
| 6,529,685 B2 | 3/2003 | Ottesen et al. |
| 6,542,695 B1 | 4/2003 | Akiba et al. |
| 6,553,178 B2 | 4/2003 | Abecassis |
| 6,698,020 B1 | 2/2004 | Zigmond et al. |
| 6,754,254 B2 | 6/2004 | Sendonaris |
| 6,788,882 B1 | 9/2004 | Geer et al. |
| 7,055,166 B1 | 5/2006 | Logan et al. |
| 2005/0025469 A1 | 2/2005 | Geer et al. |
| 2005/0132418 A1 | 6/2005 | Barton et al. |
| 2005/0226604 A1 | 10/2005 | Kawamura et al. |

FOREIGN PATENT DOCUMENTS

| | | |
|---|---|---|
| EP | 0594241 A1 | 10/1993 |
| EP | 0594241 B1 | 4/1994 |
| EP | 0726574 B1 | 8/1996 |
| EP | 0726574 A2 | 8/1996 |
| EP | 0785675 A2 | 1/1997 |
| EP | 0817483 A2 | 1/1998 |
| GB | 2222742 A | 8/1989 |
| GB | 2320637 * | 6/1998 |
| WO | WO 91/03112 A1 | 8/1990 |
| WO | 92/04573 | 6/1992 |
| WO | WO 92/22983 A2 | 12/1992 |
| WO | WO 2000/76130 A1 | 5/2000 |

OTHER PUBLICATIONS

Fujii et al., "Implementation of MPEG Transport Demultiplexer with a RISC–Based Microcontroller," IEEE, 1996.*

Neil McManes, "QuickTime ready for prime time", MacWEEK, vol. 5, No. 42, Dec. 13, 1991.

Chris Ruemmler, et al., "UNIX disk access patterns", Hewlett–Packard Laboratories, Winter USENIX, San Diego, CA, Jan. 25–29, 1993.

J.M. Harker, et al, "A Quarter Century of Disk File Innovation," IBM J. Res. Develop., vol. 25, No. 5, Sep. 1981.

Andrew David Hospodor, "The Effect of Prefetch in SCSI Disk Drive Cache Buffers," Doctoral Thesis, Santa Clara University, May 2, 1994.

D. J. Woodham, "A Solid State 'Action Replay' Recorder," International TV Symposium and Technical Exhibition, Montreux, Switzerland, Jun. 17–22, 1989.

English Language Abstract of Japanese Patent Publication No. JP 04–088772, data supplied by delphion, 1 page (Mar. 23, 1992—Date of Publication).

English Language Abstract of Japanese Patent Publication No. JP 06–233234, data supplied by delphion, 1 page (Aug. 19, 1994—Date of Publication).

English Language Abstract of Japanese Patent Publication No. JP 06–245157, data supplied by delphion, 1 page (Sep. 2, 1994—Date of Publication).

English Language Abstract of Japanese Patent Publication No. JP 07–111629, data supplied by delphion, 1 page (Apr. 25, 1995—Date of Publication).

English Language Abstract of Japanese Patent Publication No. JP 07–131754, data supplied by delphion, 1 page (May 19, 1995—Date of Publication).

English Language Abstract of Japanese Patent Publication No. JP 07–250305, data supplied by delphion, 1 page (Sep. 26, 1995—Date of Publication).

English Language Abstract of Japanese Patent Publication No. JP 07–264529, data supplied by delphion, 1 page (Oct. 13, 1995—Date of Publication).

English Language Abstract of Japanese Patent Publication No. JP 09–233415, data supplied by delphion, 2 pages (Sep. 5, 1997—Date of Publication).

I. Freedman, et al. "Systems Aspects of COBE Science Data Compression", pp. 85–97.

K. Shen et al., *A Fast Algorithm for Video Parsing Using MPEG Compressed Sequences,* IEEE, pp. 252–255 (0–8185–7310–9/626/1995).

S. Smollar et al., *Content–based Video Indexing and Retrieval,* IEEE, Summer 1994, pp. 62–72.

J. Meng et al., *CVEPS—A Compressed Video Editing and Parsing System,* ACM Multimedia '96, Boston MA, pp. 43–53 (ACM 0–89791–671–1/96/1).

Zhang, HongJiang, "Video Parsing, Retrieval and Browsing: An Integrated and Content–Based Solution," ACM Multimedia 95, Electronic Proceedings, Nov. 5–9, 1995, 16 pages.

Inside MacIntosh "QuickTime", Apple Technology Library by Apple Computer, Inc., © 1993 (published by Addison–Wesley Publishing Company) 719 pgs.

Inside MacIntosh "Files", Apple Technology Library by Apple Computer, Inc., © 1992 (published by Addison–Wesley Publishing Company) 532 pgs.

Inside MacIntosh "Memory", Apple Technology Library by Apple Computer, Inc., © 1992 (published by Addison–Wesley Publishing Company) 303 pgs.

Inside MacIntosh "QuickTime Components", Apple Technology Library by Apple Computer, Inc., © 1993 (published by Addison–Wesley Publishing Company) 828 pgs.

Inside MacIntosh "Overview", Apple Technology Library by Apple Computer, Inc., © 1992 (published by Addison–Wesley Publishing Company) 251 pgs.

Quantum Q500 Series High Capacity 5¼" Fixed Disk Drive, Quantum Corporation, © 1983 (2 pgs).

Quantum 2000 Series Low–Cost 8' Fixed Disk Drives, "New DC Motor Option", Quantum Corporation (2 pgs).

Quantum Q2080 Low–Cost, 85 Megabyte Fixed Disk Drive, "85 Mb capacity/40ms average access time", Quantum Corporation, © 1982 (2 pgs).

OEM Interface Specifications for DSAA–3xxx, 3.5–Inch Hard Disk Drive with ATA Interface, IBM Corporation, © 1994 (65 pgs).

International Standard ISO/IEC 11172–2:1993(E), (Part 2: Video), Downloaded Jun. 15, 2005 (136 pgs).

International Standard ISO/IEC 11171–3:1993/Cor.1:1996(E), (Part 3: Audio), Downloaded Jun. 15, 2005 (159 pgs).

Hewlett Packard® MPEGscope User's Guide, Hewlett Packard Company © 1997–2000 (282 pgs).

DiviCom, MP100 User Guide, DiviCom, Inc., © 1996 (97 pgs).

Hewlett Packard® MPEGscope Startup Guide, Hewlett Packard Company © 1997–2000 (39 pgs).

MediaStream by Media4, "Desktop Satellite Multimedia", "The MediaStream Receiver Card", "MediaStream Uplink System", by Media4, Inc. (2 pgs).

Jim Stratigos et al., Media4 Press Release "Announces Reseller Agreement with AlphaStar Television Networks", Microsoft® and Windows® 95 (3 pgs).

Jim Stratigos et al., Media4 Press Release "Announces Multimedia Satellite Network for Personal Computers", Microsoft® and Windows® 95 (3 pgs).

Media Stream, "Satellite Receiver" Installation and Users Guide for Windows 95, Media4, Inc., © 1996 (33 pgs).

International Standard ISO/IEC 13818–1:2000(E) "Information Technology—Generic Coding of Moving Pictures and Associated Audio Information: Systems", © ISO/IEC 2000, Downloaded Jun. 30, 2005 (173 pgs).

International Standard ISO/IEC 13818–1:2000/Amd.2:2004(E) "Information Technology—Generic Coding of Moving Pictures and Associated Audio Information: Systems", Amendment 2: Support of IPMP on MPEG–2 Systems, © ISO/IEC 2004, Downloaded Jun. 30, 2005 (13 pgs).

International Standard ISO/IEC 13818–2:2000(E) "Information Technology—Generic Coding of Moving Pictures and Associated Audio Information: Video", © ISO/IEC 2000, Downloaded Jun. 30, 2005 (219 pgs).

International Standard ISO/IEC 13818–3:1998(E) "Information Technology—Generic Coding of Moving Pictures and Associated Audio Information: Audio", © ISO/IEC 1998 (125 pgs).

Guide to VAX/VMS File Applications,, Software Version VAX/VMS Version 4.0, Sep. 1984 (19 pgs).

Harrick M. Vin, et al., *Designing A Multiuser HDTV Storage Server,* IEEE Journal, vol. 11, No. 1, Jan. 1993 (pp. 153–164).

Quantum Fireball 640/1280S Product Manual, Quantum®, Copyright © 1995 by Quantum Corporation (190 pgs).

Winston Hodge, et al., "Chapter 7, *True Video on Demand* vs. *Near Video on Demand*", delivered at National Cable Television Conference, May 24, 1994 (pp. 103–120).

Cyril U. Orji, et al., "*Design and Configuration Rationales for Digital Video Storage and Delivery Systems*", Multimedia Tools and Applications, 9, 275–302 (1992), © 1992 Kluwer Academic Publishers, Boston (pp. 275–302).

SCSI Specification, 0663 and 0663 Enhanced Disk Drive, Release 4.0, (247 pgs).

R. Johnston, et al., "*A Digital Television Sequence Store*", IEEE, (pp. 594–600) © 1978.

M. Hausdorfer, "*Symposium Record Broadcast Sessions*", HDTV Production: Today and Tomorrow, Jun. 17, 1989, (7 pgs).

S. Berson, "*Computer Science Department Technical Report*", Staggered Striping in Multimedia Information System, December 1993, Apr. 29, 1994, (24 pgs).

S. Berson, et al., "*Design of a Scalable Multimedia Storage Manager*", (pp. 1–30).

Conner Filepro Performance Series, CFP1060E/CFP1060S/CFP1060W, "*Intelligent Disk Drive Product Manual*", Rev. A, May 1984, © 1994, Conner Peripherals, Inc., (79 pgs).

Hugh M. Sierra, "*An Introduction to Direct Access Storage Devices*", © 1990 by Academic Press, Inc., (269 pgs).

Douglas T. Anderson, "*The Hard Disk Technical Guide*", Tenth Revision S–D., Feb. 1994, © 1990, 1991, 1992, 1993, 1994 by Micro House International Inc., (70 pgs).

Astarte DVDirector™, Beta Testing Program.

International Standard ISO/IEC 11172 (MPEG–1 Standard, Part 1: Systems).

K. Shen et al., *A fast algorithm for video parsing using MPEG compressed sequences*, IEEE, pp. 252–255 (0–8185–7310–9/959/1995).

S. Smollar et al., *Content–based video indexing and retrieval*, IEEE, Summer 1994, pp. 62–72.

H. Zhang et al, *Video parsing, retrieval and browsing: an integrated and content–based solution*, ACM Multimedia 95–Electronic Proceedings (Nov. 5–9, 1995, San Francisco, CA).

*TiVo Inc.* vs. *Echostar Communications Corp, et al.,* Case No. 2:04–CV–1–DF, "Verdict Form", filed Apr. 13, 2006 in U.S. District Court, Eastern District of Texas, Marshall Division (8 pgs).

Office Action from European Patent Office for foreign application No. 06019602.9 dated Jan. 10, 2007, including attachments (26 pages).

European Search Report for foreign application No. 06019602.9 dated Nov. 6, 2006 (5 pages).

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–61 is confirmed.

* * * * *

US006233389C2

(12) EX PARTE REEXAMINATION CERTIFICATE (8037th)
United States Patent
Barton et al.

(10) Number: US 6,233,389 C2
(45) Certificate Issued: Feb. 15, 2011

(54) MULTIMEDIA TIME WARPING SYSTEM

(75) Inventors: James M. Barton, Los Gatos, CA (US); Roderick James McInnis, Milpitas, CA (US); Alan S. Moskowitz, San Francisco, CA (US); Andrew Martin Goodman, Menlo Park, CA (US); Ching Tong Chow, Fremont, CA (US); Jean Swey Kao, Cupertino, CA (US)

(73) Assignee: Citigroup Global Markets Realty Corp., New York, NY (US)

Reexamination Request:
No. 90/009,329, Nov. 10, 2008

Reexamination Certificate for:
Patent No.: 6,233,389
Issued: May 15, 2001
Appl. No.: 09/126,071
Filed: Jul. 30, 1998

Reexamination Certificate C1 6,233,389 issued Nov. 11, 2008

(51) Int. Cl.
*G11B 27/10* (2006.01)
*G11B 27/034* (2006.01)
*G11B 27/031* (2006.01)
*G11B 27/032* (2006.01)
*H04N 5/775* (2006.01)
*H04N 5/44* (2006.01)
*H04N 5/00* (2006.01)

(52) U.S. Cl. ............... 386/46; 348/E5.007; 348/E5.108; 386/68; 386/E5.043; 386/E5.07

(58) Field of Classification Search ..................... 386/46
See application file for complete search history.

(56) References Cited

U.S. PATENT DOCUMENTS 2,865,990 A    12/1958    Towler (Continued)

FOREIGN PATENT DOCUMENTS

CA    2 137 745 C    7/2004

(Continued)

OTHER PUBLICATIONS

U.S. Court of Appeals for the Federal Circuit, *TiVo Inc.* v. *Echostar Corporation et al.*, 2009–1374, Order Affirming Comtempt Ruling, Mar. 4, 2010.

(Continued)

*Primary Examiner*—Fred Ferris

(57) ABSTRACT

A multimedia time warping system. The invention allows the user to store selected television broadcast programs while the user is simultaneously watching or reviewing another program. A preferred embodiment of the invention accepts television (TV) input streams in a multitude of forms, for example, National Television Standards Committee (NTSC) or PAL broadcast, and digital forms such as Digital Satellite System (DSS), Digital Broadcast Services (DBS), or Advanced Television Standards Committee (ATSC). The TV streams are converted to an Moving Pictures Experts Group (MPEG) formatted stream for internal transfer and manipulation and are parsed and separated it into video and audio components. The components are stored in temporary buffers. Events are recorded that indicate the type of component that has been found, where it is located, and when it occured. The program logic is notified that an event has occurred and the data is extracted from the buffers. The parser and event buffer decouple the CPU from having to parse the MPEG stream and from the real time nature of the data streams which allows for slower CPU and bus speeds and translate to lower system costs. The video and audio components are stored on a storage device and when the program is requested for display, the video and audio components are extracted from the storage device and reassembled into an MPEG stream which is sent to a decoder. The decoder converts the MPEG stream into TV output signals and delivers the TV output signals to a TV receiver. User control commands are accepted and sent through the system. These commands affect the flow of said MPEG stream and allow the user to view stored programs with at least the following functions: reverse, fast forward, play, pause, index, fast/slow reverse play, and fast/slow play.

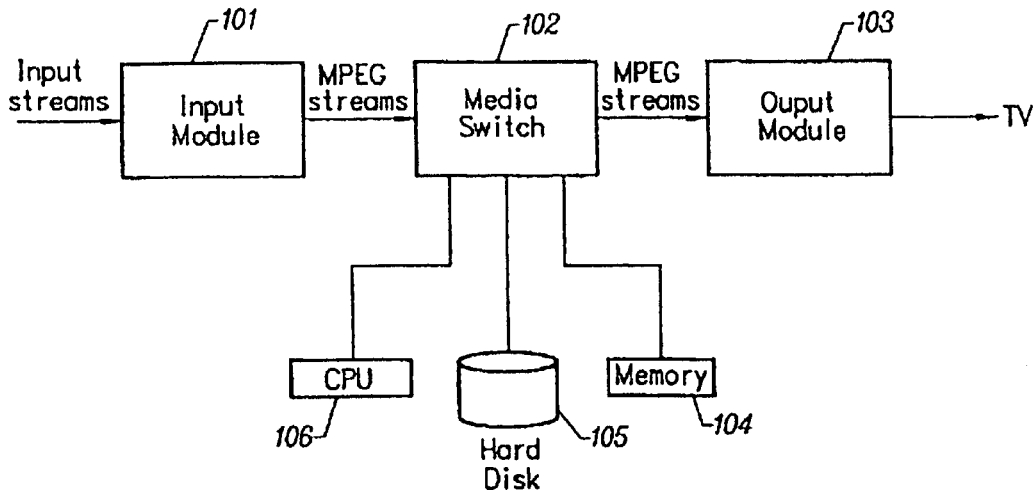

U.S. PATENT DOCUMENTS

| Patent Number | Date | Name |
|---|---|---|
| 4,221,176 A | 9/1980 | Besore et al. |
| 4,233,628 A | 11/1980 | Ciciora |
| 4,306,250 A | 12/1981 | Summers et al. |
| 4,566,034 A | 1/1986 | Harger et al. |
| 5,124,854 A | 6/1992 | Iyota et al. |
| 5,222,150 A | 6/1993 | Tajima |
| 5,317,556 A | 5/1994 | Tsuboi et al. |
| 5,363,362 A | 11/1994 | Maeda et al. |
| 5,388,264 A | 2/1995 | Tobias, II et al. |
| 5,406,626 A | 4/1995 | Ryan |
| 5,438,423 A | 8/1995 | Lynch et al. |
| 5,475,498 A | 12/1995 | Radice |
| 5,475,656 A | 12/1995 | Sato et al. |
| 5,479,056 A | 12/1995 | Mabuchi |
| 5,486,687 A | 1/1996 | Le Roux |
| 5,488,433 A | 1/1996 | Washino et al. |
| 5,497,244 A | 3/1996 | Chargin, Jr. et al. |
| 5,506,902 A | 4/1996 | Kubota |
| 5,510,858 A | 4/1996 | Shido et al. |
| 5,535,008 A | 7/1996 | Yamagishi et al. |
| 5,546,250 A | 8/1996 | Diel |
| 5,557,724 A | 9/1996 | Sampat et al. |
| 5,572,442 A | 11/1996 | Schulhof et al. |
| 5,574,662 A | 11/1996 | Windrem et al. |
| 5,590,195 A | 12/1996 | Ryan |
| 5,596,581 A | 1/1997 | Saeijs et al. |
| 5,598,352 A | 1/1997 | Rosenau et al. |
| 5,600,379 A | 2/1997 | Wagner |
| 5,659,653 A | 8/1997 | Diehl et al. |
| 5,703,655 A | 12/1997 | Corey et al. |
| 5,721,817 A | 2/1998 | Kurihara et al. |
| 5,751,806 A | 5/1998 | Ryan |
| 5,761,372 A | 6/1998 | Yoshinobu et al. |
| 5,796,695 A | 8/1998 | Tsutsui |
| 5,805,804 A | 9/1998 | Laursen et al. |
| 5,815,671 A | 9/1998 | Morrison |
| 5,832,085 A | 11/1998 | Inoue et al. |
| 5,856,930 A | 1/1999 | Hosono |
| 5,862,342 A | 1/1999 | Winter et al. |
| 5,864,582 A | 1/1999 | Ander et al. |
| 5,870,710 A | 2/1999 | Ozawa et al. |
| 5,898,695 A | 4/1999 | Fujii et al. |
| 5,909,257 A | 6/1999 | Ohishi et al. |
| 5,914,941 A | 6/1999 | Janky |
| 5,930,493 A | 7/1999 | Ottesen et al. |
| 5,940,074 A | 8/1999 | Britt, Jr. et al. |
| 5,949,948 A | 9/1999 | Krause et al. |
| 5,990,881 A | 11/1999 | Inoue et al. |
| 6,018,612 A | 1/2000 | Thomason et al. |
| 6,028,774 A | 2/2000 | Shin et al. |
| 6,163,646 A | 12/2000 | Tanaka et al. |
| 6,172,712 B1 | 1/2001 | Beard |
| 6,181,706 B1 | 1/2001 | Anderson et al. |
| 6,209,041 B1 | 3/2001 | Shaw et al. |
| 6,263,396 B1 | 7/2001 | Cottle et al. |
| 6,282,209 B1 | 8/2001 | Kataoka et al. |
| 6,317,885 B1 | 11/2001 | Fries |
| 6,330,334 B1 | 12/2001 | Ryan |
| 6,332,175 B1 | 12/2001 | Birrell et al. |
| 6,353,461 B1 | 3/2002 | Shore et al. |
| 6,359,636 B1 | 3/2002 | Schindler et al. |
| 6,363,212 B1 | 3/2002 | Fujinami et al. |
| 6,480,667 B1 | 11/2002 | O'Connor |
| 6,490,000 B1 | 12/2002 | Schaefer et al. |
| 6,496,647 B2 | 12/2002 | Arai et al. |
| 6,535,465 B1 | 3/2003 | Shigetomi et al. |
| 6,546,556 B1 | 4/2003 | Kataoka et al. |
| 6,694,200 B1 | 2/2004 | Naim |
| 6,697,944 B1 | 2/2004 | Jones et al. |
| 6,704,493 B1 | 3/2004 | Matthews et al. |
| 6,748,539 B1 | 6/2004 | Lotspiech |
| 6,829,254 B1 | 12/2004 | Rajahalme et al. |
| 6,865,431 B1 | 3/2005 | Hirota et al. |
| 6,959,221 B1 | 10/2005 | Kataoka |
| 6,993,567 B1 | 1/2006 | Yodo et al. |
| 7,050,705 B1 | 5/2006 | Mori |
| 7,272,298 B1 | 9/2007 | Lang |
| 7,607,157 B1 | 10/2009 | Inoue et al. |
| 2001/0013120 A1 | 8/2001 | Tsukamoto |
| 2002/0003949 A1 | 1/2002 | Mamiya et al. |
| 2002/0012531 A1 | 1/2002 | Flannery |
| 2002/0056118 A1 | 5/2002 | Hunter et al. |
| 2002/0144265 A1 | 10/2002 | Connelly |
| 2002/0164156 A1 | 11/2002 | Bilbrey |
| 2002/0176690 A1 | 11/2002 | Nagasawa |
| 2003/0040962 A1 | 2/2003 | Lewis |
| 2004/0193900 A1 | 9/2004 | Nair |
| 2005/0122335 A1 | 6/2005 | MacInnis et al. |
| 2005/0132418 A1 | 6/2005 | Barton et al. |
| 2006/0045470 A1 | 3/2006 | Poslinski et al. |
| 2007/0230921 A1 | 10/2007 | Barton et al. |
| 2008/0288998 A1 | 11/2008 | Locket et al. |
| 2009/0136215 A1 | 5/2009 | Barton et al. |
| 2009/0208185 A1 | 8/2009 | Barton et al. |
| 2009/0269024 A1 | 10/2009 | Lockett et al. |
| 2010/0080529 A1 | 4/2010 | Barton et al. |

FOREIGN PATENT DOCUMENTS

| Country | Number | Date |
|---|---|---|
| CN | 1189045 A | 7/1998 |
| EP | 0 651 328 A1 | 5/1995 |
| EP | 0 762 756 A2 | 3/1997 |
| EP | 0 784 400 A2 | 7/1997 |
| EP | 0 766 476 A2 | 4/2007 |
| GB | 2 286 282 A | 8/1995 |
| GB | 2333017 A | 7/1999 |
| JP | 61-133089 A | 6/1986 |
| JP | 2-266774 A | 10/1990 |
| JP | 3-34685 A | 1/1991 |
| JP | 7-44907 A | 2/1995 |
| JP | 8-279273 A | 10/1996 |
| JP | 10-56620 A | 2/1998 |
| JP | 11-203135 A | 7/1999 |
| JP | 2000-295560 A | 10/2000 |
| WO | WO 93/16557 A1 | 8/1993 |
| WO | WO 94/17626 A1 | 7/1994 |
| WO | WO 95/33336 A1 | 12/1995 |
| WO | WO 98/48566 A2 | 10/1998 |
| WO | WO 98/56188 A2 | 12/1998 |
| WO | WO 00/33568 A1 | 6/2000 |
| WO | WO 03/019932 A1 | 3/2003 |

OTHER PUBLICATIONS

U.S. District Court for Tile Eastern District of Texas, Marshall Division, AT&T's and Microsoft Corporation's Invalidity Contentions, *TiVo Inc.* vs. *AT&T Inc. and Microsoft Corporation*, Case No. 2:09–CV–259–DF, 44 pages, May 21, 2010.

Exhibit A14 to AT&T's and Microsoft Corporation's Invalidity Contentions: Claim Chart of U.S. Patent No. 6,223,389 in view of U.S. Patent No. 6,018,612, and in further view of U.S. Patent No. 5,477,263 and U.S. Patent No. 6,169,843, 11 pages.

Exhibit A1 to AT&T's and Microsoft Corporation's Invalidity Contentions: Claim Chart of U.S. Patent No. 6,233,389 in view of U.S. Patent No. 5,557,724 to Sampat, 23 pages.

Exhibit A12 to AT&T's and Microsoft Corporation's Invalidity Contentions: Claim Chart of U.S. Patent No. 6,233,389 in view of U.S. Patent No. 5,721,815 to Ottesen et al., 18 pages.

Exhibit A8 to AT&T's and Microsoft Corporation's Invalidity Contentions: Claim Chart of U.S. Patent No. 6,233,389 in view of U.S. Patent No. 5,822,493, 161 pages.

Exhibit A13 to AT&T's and Microsoft Corporation's Invalidity Contentions: Claim Chart of U.S. Patent No. 6,233,389 in view of U.S. Patent No. 6,018,612 to Thomason, et al. and further in view of U.S. Patent No. 5,949,948 to Krause et al., 7 pages.

Exhibit A20 to AT&T's and Microsoft Corporation's Invalidity Contentions: Claim Chart of U.S. Patent No. 6,233,389 in view of U.S. Patent No. 5,990,881, 6 pages.

Exhibit A2 to AT&T's and Microsoft Corporation's Invalidity Contentions: Claim Chart of U.S. Patent No. 6,233,389 in view of U.S. Patent No. 6,169,843, 6 pages.

Exhibit A6 to AT&T's and Microsoft Corporation's Invalidity Contentions: Claim Chart of U.S. Patent No. 6,233, 389 in view of U.S. Patent No. 6,172,712, 137 pages.

Exhibit A3 to AT&T's and Microsoft Corporation's Invalidity Contentions: Claim Chart of U.S. Patent No. 6,233,389 in view of U.S. Patent No. 6,181,706, 5 pages.

Exhibit A5 to AT&T's and Microsoft Corporation's Invalidity Contentions: Claim Chart of U.S. Patent No. 6,233,389 in view of U.S. Patent No. 6,209,041, 140 pages.

Exhibit A19 to AT&T's and Microsoft Corporation's Invalidity Contentions: Claim Chart of U.S. Patent No. 6,233,389 in view of U.S. Patent No. 6,304,714 to Krause et al., 7 pages.

Exhibit A23 to AT&T's and Microsoft Corporation's Invalidity Contentions: Claim Chart of U.S. Patent No. 6,233,389 in view of DISHPlayer 7100 System and U.S. Patent No. 6,490,000, 21 pages.

Exhibit A9 to AT&T's and Microsoft Corporation's Invalidity Contentions: Claim Chart of U.S. Patent No. 6,233,389 in view of U.S. Patent No. 6,490,000, 134 pages.

Exhibit A4 to AT&T's and Microsoft Corporation's Invalidity Contentions: Claim Chart of U.S. Patent No. 6,233,389 in view of U.S. Patent No. 7,272,298 to Richard Lang, 11 pages.

Exhibit A7 to AT&T's and Microsoft Corporation's Invalidity Contentions: Claim Chart of U.S. Patent No. 6,233,389 in view of Graham Thomason, EP0594241, 136 pages.

Exhibit A22 to AT&T's and Microsoft Corporation's Invalidity Contentions: Claim Chart of U.S. Patent No. 6,233,389 in view of Developing Object–Oriented Multimedia Software by Philip Ackermann, 9 pages.

Exhibit A10 to AT&T's and Microsoft Corporation's Invalidity Contentions: Claim Chart of U.S. Patent No. 6,233,389 in view of C. Hanna et al., Demultiplexer IC For MPEG2 Transport Streams, 138 pages.

Exhibit A11 to AT&T's and Microsoft Corporation's Invalidity Contentions: Claim Chart of U.S. Patent 6,233,389 in view of Robert Jonnston, A Digital Television Sequence Store, 148 pages.

Exhibit A16 to AT&T's and Microsoft Corporation's Invalidity Contentions: Claim Chart of U.S. Patent No. 6,233,389 in view of "A Programming System for the Dynamic Manipulation of Temporally Sensitive Data" by Christopher J. Lindblad, 16 pages.

Exhibit A15 to AT&T's and Microsoft Corporation's Invalidity Contentions: Claim Chart of U.S. Patent No. 6,233,389 in view of "StreamObjects: Dynamically–Segmented Scalable Media Over the Internet" by Steven Niemczyk, 17 pages.

Exhibit A17 to AT&T's and Microsoft Corporation's Invalidity Contentions: Claim Chart of U.S. Patent No. 6,233,389 in view of "An Architecture for Networkded Multimedia" by Jonathan C. Soo, 12 pages.

Exhibit A18 to AT&T's and Microsoft Corporation's Invalidity Contentions: Claim Chart of U.S. Patent No. 6,233,389 in view of "Design of a Storage and Retrieval Model for Multimedia Data" by Ruihong Wang, 11 pages.

Exhibit A21 to AT&T's and Microsoft Corporation's Invalidity Contentions: Claim Chart of U.S. Patent No. 6,233,389 in view of U.S. Patent No. 5,898,695, 6 pages.

Ash, Robert, *Real–Time Encoding and Feeds in Oracle Video Server*, Oracle Corporation, entire document (Mar. 1998).

Cline, Linda S. et al., "DirectShow™ RTP Support for Adaptivity in Networked Multimedia Applications," *Proc. of the IEEE International Conference on Multimedia Computing and Systems*, 10 pages (1998).

Hanna, C. et al., "Demultiplexer IC for MPEG2 Transport Streams," *IEEE Transactions on Consumer Electronics*, vol. 41, No. 3, pp. 699–706 (Aug. 1995).

Kurioka, Tatsuya et al., "Television Home Server for Integrated Services—Toward the Realization of ISDB 'Anytime' Services," *Proceedings ISCE '97, IEEE International Symposium on Consumer Electronics*, pp. 250–253 (Dec. 2, 1997).

Lindblad, Christopher, *A Programming System for the Dynamic Manipulation of Temporally Sensitive Data*, MIT Laboratory for Computer Science, 275 pages (Aug. 1994).

Linden, Brian and Prather, Matt, *Oracle Video Server: Introducing the Oracle Video Server*, Release 3.0, entire document (1998).

Niemczyk, Steven, *Stream Objects: Dynamically Segmented Scalable Media Over the Internet*, Thesis, Massachusetts Institute of Technology, 90 pages (May 27, 1996).

Oracle Corporation, *Video–Enhanced Web Services*, An Oracle, Digital, Ericsson and Acorn White Paper, entire document (Mar. 1998).

Soo, Jonathan, *An Architecture for Networked Multimedia*, Thesis, Massachusetts Institute of Technology, 49 pages (May 1995).

*Tektronix PDR 100 Profile™ Video Disk Recorder, User Manual*, entire document (First Printing: Feb. 1995, Revised: Aug. 1995).

Wang, Ruihong, *Design of a Storage and Retrieval Model for Multimedia Data*, Thesis, University of Ottawa, 116 pages (1994).

English language abstract for Japanese Patent Publication No. JP 61–133089 A, published Jun. 20, 1986, 2 pages.

English language abstract for Japanese Patent Publication No. JP 2–266774 A, published Oct. 31, 1990, 2 pages.

English language abstract for Japanese Patent Publication No. JP 3–34685 A, published Feb. 14, 1991, 2 pages.

Peuker, Thomas, "An Object–Oriented Architecture for the Real–Time Transmission of Multimedia Data Streams", Institute fur Mathematische Maschinen und Datenverarbeitung (Informatik) IV, Lehrstul fur Betriebssyteme Universitat Erlangen–Nurnberg, Erlangen, Mar. 17, 1997.

Mayer–Patel, Ketan et al., "Synchronized Continuous Media Playback Through the World Wide Web", U.C. Berkeley, Computer Science Division, Berkeley Multimedia Research Center, Published:1996, Berkeley, CA.

Chatterjee, Amit et al., "Microsoft Directshow: A New Media Architecture", SMPTE Journal, pp. 865–871, Dec. 1997.

Fung, Chi–Leung et al., "MOCS: an Object–Oriented Programming Model for Multimedia Object Communication and Synchronization", Department of Computer Science, The Hong Kong University of Science and Technology, Clear Water Bay, Kowloon, Hong Kong, 1994 IEEE.

Gibbs, Simon, "Composite Multimedia and Active Objects", Centre Universitaire d";Informatique, Universite de Geneve, Proc., appeared in OOPSLA '91.

"New Graphics Enhancements Will Be On Display at NAB (National Association of Broadcasters Exhibition", Broadcasting, v118, n11, p. 57, Mar. 12, 1990.

"Next Video Recorder—Tape or Disc?", Consumer Electronics, v33, n8, Feb. 22, 1993.

McLarnon, Zed, et al., "Digital Image Meets Digital Audio; Sync Problems Faced by Multimedia Producer Now", Advanced Imaging, v9, n1, p. 62, Jan. 1994.

Nelson, Lee J. "The Latest In Compression Hardware & Software (Product Survey)", Advanced Imaging v9, p. 56, Jan. 1994.

Leek, Matthew R., et al., "MPEG Q&A (Moving Pictures Expert Group Digital Video Compression Standard)", CD–ROM Professional, v7, n4, p. 41, Jul.–Aug. 1994.

Ceccarelli, M. et al., "A sequence analysis system for video database," *Time–Varying Image Processing and Moving Object Recognition*, 4, Elesevier Science B.V., pp. 133–138, 1997.

Hanjalic et al, "Automation of systems enabling search on stored video data," *SPIE/IS& T Electronic Imaging '97*, vol. 3022, pp. 427–438, Jan. 15, 1997.

DMA, published in Embedded Systems Programming, 4 pages, Oct. 1994.

English language abstract for Chinese Patent Publication No. CN 1189045 A, published Jul. 29, 1998, 1 page.

English language abstract for Japanese Patent Publication No. JP 7–44907 A, published Feb. 14, 1995, 1 page.

English language abstract for Japanese Patent Publication No. JP 8–279273 A, published Oct. 22, 1996, 1 page.

English language abstract for Japanese Patent Publication No. JP 10–56620 A, published Feb. 24, 1998, 1 page.

Partial English language translation for Japanese Patent Publication No. JP 11–203135 A, published Jul. 30, 1999, 2 pages.

Partial English language translation for Japanese Patent Publication No. JP 2000–295560 A, published Oct. 20, 2000, 3 pages.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 31 and 61 is confirmed.

Claims 1-30 and 32-60 were not reexamined.

\* \* \* \* \*